US011901795B1

(12) United States Patent
Graves et al.

(10) Patent No.: US 11,901,795 B1
(45) Date of Patent: Feb. 13, 2024

(54) ROTOR ASSEMBLY INCLUDING TAPERED MAGNETS WITHIN A RETAINING SLEEVE AND A METHOD FOR ASSEMBLING THE SAME

(71) Applicant: ARCHER AVIATION, INC., San Jose, CA (US)

(72) Inventors: Scott Graves, San Jose, CA (US); Diego Silva, San Jose, CA (US)

(73) Assignee: ARCHER AVIATION, INC., San Jose, CA (US)

( * ) Notice: Subject to any disclaimer, the term of this patent is extended or adjusted under 35 U.S.C. 154(b) by 0 days.

(21) Appl. No.: 18/316,931

(22) Filed: May 12, 2023

Related U.S. Application Data

(60) Provisional application No. 63/378,680, filed on Oct. 7, 2022, provisional application No. 63/378,536, filed on Oct. 6, 2022.

(51) Int. Cl.
| | |
|---|---|
| H02K 7/00 | (2006.01) |
| H02K 1/27 | (2022.01) |
| B64D 27/24 | (2006.01) |
| H02K 1/32 | (2006.01) |
| H02K 15/03 | (2006.01) |
| B64C 29/00 | (2006.01) |

(52) U.S. Cl.
CPC ......... H02K 7/006 (2013.01); B64C 29/0033 (2013.01); B64D 27/24 (2013.01); H02K 1/27 (2013.01); H02K 1/32 (2013.01); H02K 15/03 (2013.01)

(58) Field of Classification Search
CPC ............ H02K 1/27; H02K 1/32; H02K 7/006; H02K 15/03; B64C 29/0033; B64D 27/24
USPC ....................................................... 244/53 R
See application file for complete search history.

(56) References Cited

U.S. PATENT DOCUMENTS

| | | | |
|---|---|---|---|
| 4,729,160 A | 3/1988 | Brown | |
| 4,918,802 A | 4/1990 | Schaefer | |
| 2002/0175588 A1* | 11/2002 | Rajasingham | ........... H02K 3/04 310/179 |
| 2011/0012463 A1* | 1/2011 | Duncan | .................... H02K 7/14 310/156.43 |
| 2011/0175479 A1* | 7/2011 | Marchitto | ............ H02K 1/2791 310/156.01 |
| 2011/0260566 A1* | 10/2011 | Odvarka | .............. H02K 1/2796 29/598 |
| 2015/0015124 A1* | 1/2015 | Rajasingham | ........... H02K 3/02 310/58 |

(Continued)

FOREIGN PATENT DOCUMENTS

CN 114977575 A 8/2022

*Primary Examiner* — Brady W Frazier
(74) *Attorney, Agent, or Firm* — Finnegan, Henderson, Farabow, Garrett & Dunner, LLP.

(57) ABSTRACT

A rotor assembly has a sleeve, a rotor hub, a lamination core, and a plurality of tapered magnets disposed circumferentially around an inner diameter of the sleeve. The plurality of tapered magnets are configured to abut on one another. The plurality of tapered magnets includes a first set of tapered magnets and a second set of tapered magnets. Insertion of the first set of tapered magnets axially relative to the second set of tapered magnets is configured to increase a diameter of the sleeve. The rotor hub is configured to retain at least one of the lamination core, the plurality of tapered magnets, or the sleeve.

18 Claims, 33 Drawing Sheets

(56) References Cited

U.S. PATENT DOCUMENTS

| | | | |
|---|---|---|---|
| 2015/0042099 A1* | 2/2015 | Muniz Casais | H02K 1/2773 |
| | | | 290/55 |
| 2018/0269738 A1* | 9/2018 | Scheer | H02K 7/006 |
| 2020/0220403 A1* | 7/2020 | Klassen | H02K 1/2791 |

* cited by examiner

US 11,901,795 B1

ROTOR ASSEMBLY INCLUDING TAPERED MAGNETS WITHIN A RETAINING SLEEVE AND A METHOD FOR ASSEMBLING THE SAME

CROSS-REFERENCE TO RELATED APPLICATIONS

This disclosure claims priority to U.S. Provisional Application No. 63/378,536, titled "Tilt Rotor Systems and Methods for eVTOL Aircraft," filed Oct. 6, 2022, and U.S. Provisional Application No. 63/378,680, titled "Systems and Methods for Improved Propulsion Systems for eVTOL Aircraft," filed Oct. 7, 2022, the contents of which are incorporated herein in their entirety.

TECHNICAL FIELD

This disclosure relates generally to the field of powered aerial vehicles. More particularly, and without limitation, the present disclosure relates to innovations in aircrafts driven by electric propulsion systems. Certain aspects of the present disclosure generally relate to improvements in rotor assemblies for electric engines and methods of assembling the same that may be used in aircrafts driven by electric propulsion systems and in other types of vehicles.

SUMMARY

The present disclosure addresses systems, components, and techniques primarily for use in a non-conventional aircraft driven by an electric propulsion system. For example, the tilt-rotor aircraft of the present disclosure may be configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it may be desired that components of the aircraft are configured and designed to withstand frequent use without wearing, generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft be propelled by a distributed propulsion system, avoiding the risk of a single point of failure, and that the aircraft be capable of conventional takeoff and landing on a runway. Moreover, it may be desired that the aircraft may safely vertically takeoff and land from and into relatively small or restricted spaces compared to traditional airport runways (e.g., vertiports, parking lots, or driveways) while transporting several passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft driven by an electric propulsion system.

In some embodiments, the aircraft driven by an electric propulsion system of the present disclosure may be designed to be capable of both vertical and conventional takeoff and landing, with a distributed electric propulsion system enabling vertical flight, horizontal and lateral flight, and transition. Thrust may be generated by supplying high voltage electrical power to a plurality of electric engines of the distributed electric propulsion system, which may include the necessary components to convert the high voltage electrical power into mechanical shaft power to rotate a propeller. Embodiments disclosed herein may involve optimizing the energy density of the electric propulsion system. Embodiments may include an electric engine connected to an onboard electrical power source, which may include a device capable of storing energy such as a battery or capacitor, and may include one or more systems for harnessing or generating electricity such as a fuel powered generator or solar panel array. Some disclosed embodiments provide for weight reduction and space reduction of components in the aircraft to, increase aircraft efficiency and performance. Disclosed embodiments also improve upon safety in passenger transportation using new and improved safety protocols and system redundancy in the case of a failure, to minimize any single points of failure in the aircraft propulsion system. Some disclosed embodiments also provide new and improved approaches to satisfying and exceeding aviation and transportation laws and regulations. For example, the Federal Aviation Administration enforces federal laws and regulations requiring safety components such as fire protective barriers adjacent to engines that use more than a threshold amount of oil or other flammable materials. A fire protective barrier may include an engine component or aircraft component designed, constructed, or installed with the primary purpose of being constructed so that no hazardous quantity of air, fluid, or flame can pass around or through the fire protective barrier and/or to protect against corrosion. In some embodiments, a fire protective barrier may include a component separate from additional components as recited herein. In some embodiments, a fire protective barrier may include a firewall, a fireproof barrier, a fire resistant barrier, a flame resistant barrier, or any other barrier capable of ensuring no hazardous quantity of air, fluid, or flame can pass around or through the barrier and/or to protect against corrosion. For example, while a fuselage may be constructed so that no hazardous quantity of air, fluid, or flame can pass around or through the fire protective barrier, and/or protect against corrosion, the fuselage may not be considered a fire protective barrier since the primary purpose of a fuselage is not to be a fire protective barrier. In some embodiments, electric propulsion systems provide for efficient and effective lubrication and cooling using less than a threshold level of oil, yielding an aircraft that does not require engine fire protective barriers, saving on aircraft weight while maximizing performance and efficiency.

In some embodiments, the distributed electric propulsion system may include twelve electric engines, which may be mounted on booms forward and aft of the main wings of the aircraft. A subset of the electric engines, such as those mounted forward of the main wings, may be tiltable mid-flight between a horizontally oriented position (e.g., to generate forward thrust for cruising) and a vertically oriented position (e.g., to generate vertical lift for takeoff, landing, and hovering). The propellers of the forward electric engines may rotate in a clockwise or counterclockwise direction. Propellers may counter-rotate with respect to adjacent propellers. The aft electric engines may be fixed in a vertically oriented position (e.g., to generate vertical lift). The propellers associated with the aft electric engines may also rotate in a clockwise or counterclockwise direction. In some embodiments, the difference in rotation direction may be achieved using the direction of engine rotation. In other embodiments, the engines may all rotate in the same direction, and gearing may be used to achieve different propeller rotation directions In some embodiments, an aircraft may possess quantities of electric engines in various combinations of forward and aft engine configurations. For example, an aircraft may possess six forward and six aft electric engines, four forward and four aft electric engines, or any other combination of forward and aft engines, including embodiments where the number of forward electric engines and aft electric engines are not equivalent.

In some embodiments, for a vertical takeoff and landing (VTOL) mission, the forward and aft electric engines may provide vertical thrust during takeoff and landing. During flight phases where the aircraft is moving forward, the forward electric engines may provide horizontal thrust, while the propellers of the aft electric engines may be stowed at a fixed position to minimize drag. The aft electric engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a horizontal or near-horizontal direction during a forward-flight cruising phase. A variable pitch mechanism may change the forward electric engine's propeller-hub assembly blade collective angles for operation during the hover-phase, transition phase, and cruise-phase.

In some embodiments, in a conventional takeoff and landing (CTOL) mission, the forward electric engines may provide horizontal thrust for wing-borne take-off, cruise, and landing, and the wings may provide vertical lift. In some embodiments, the aft electric engines may not be used for generating thrust during a CTOL mission and the aft propellers may be stowed in place. In other embodiments, the aft electrical engines may be used at reduced power to shorten the length of the CTOL takeoff or landing.

Disclosed embodiments may involve a rotor assembly including a sleeve, a rotor hub, a lamination core, and a plurality of tapered magnets. The plurality of tapered magnets may abut on one another along an inner diameter of the sleeve. The plurality of tapered magnets may be circumferentially inserted against one another to stretch the sleeve and induce pressure on the sleeve. The rotor hub may retain at least one of the lamination core, the plurality of tapered magnets, and/or the sleeve.

In some embodiments, the sleeve may retain the plurality of tapered magnets. The sleeve may be comprised of carbon fiber. The lamination core may include at least one notch. Disclosed embodiments may involve a first rotor hub abutting on a first side of the lamination core, and a second rotor hub abutting on a second side of the lamination core. Disclosed embodiments may involve at least one cavity disposed between the plurality of tapered magnets and the lamination core, wherein the at least one cavity is configured to guide a fluid for cooling. In some embodiments, the lamination core or the at least one cavity may allow direct cooling of the plurality of magnets.

Disclosed embodiments may include an electric propulsion system for a vertical take-off and landing (VTOL) aircraft. The electric propulsion system may include at least one electrical engine mechanically connected directly or indirectly to a fuselage of the VTOL aircraft. The electrical engine may include a gearbox assembly including a sun gear and an electrical motor having a stator and rotor assembly. The rotor assembly may include a sleeve, a rotor hub, a lamination core, and a plurality of tapered magnets. The plurality of tapered magnets may abut on one another along an inner diameter of the sleeve. The plurality of tapered magnets may be circumferentially inserted against one another to stretch the sleeve and induce pressure on the sleeve. The rotor hub may retain at least one of the lamination core, the plurality of tapered magnets, or the sleeve. The sun gear may be attached to the rotor hub.

In some embodiments, the sleeve may retain the plurality of tapered magnets. The sleeve may be comprised of carbon fiber. The lamination core may include at least one notch. Disclosed embodiments may involve a first rotor hub abutting on a first side of the lamination core, and a second rotor hub abutting on a second side of the lamination core. Disclosed embodiments may involve at least one cavity disposed between the plurality of tapered magnets and the lamination core, wherein the at least one cavity is configured to guide a fluid for cooling. In some embodiments, the lamination core or the at least one cavity may allow direct cooling of the plurality of magnets. In some embodiments, the gearbox may include a bearing, wherein an outer diameter of the bearing contacts an inner diameter of the sun gear.

Disclosed embodiments may involve a method of assembling a rotor assembly including generating pressure in a premade sleeve by expanding the premade sleeve by circumferentially inserting a magnet arrangement. Assembling a rotor may comprise manufacturing, fabricating, or producing a rotor. The magnet arrangement may include a first plurality of tapered magnets and a second plurality of tapered magnets. The magnet arrangement may abut on an inner diameter of the premade sleeve. In some embodiments, circumferentially inserting the magnet arrangement may increase an outer diameter of the magnet arrangement. Disclosed embodiments may involve pushing, in an axial direction, the first plurality of tapered magnets against the second plurality of tapered magnets. Pushing may stretch the sleeve. Disclosed embodiments may involve inserting a lamination core, wherein an outer diameter of the lamination core abuts the magnet arrangement. Disclosed embodiments may involve attaching at least one rotor hub to the lamination core.

Disclosed embodiments may involve inserting a bearing into a sun gear, and attaching the sun gear to the at least one rotor hub. The at least one rotor hub may retain at least one of the lamination core, the magnet arrangement, or the premade sleeve. The premade sleeve may retain the magnet arrangement.

DETAILED DESCRIPTION

Figure 1:
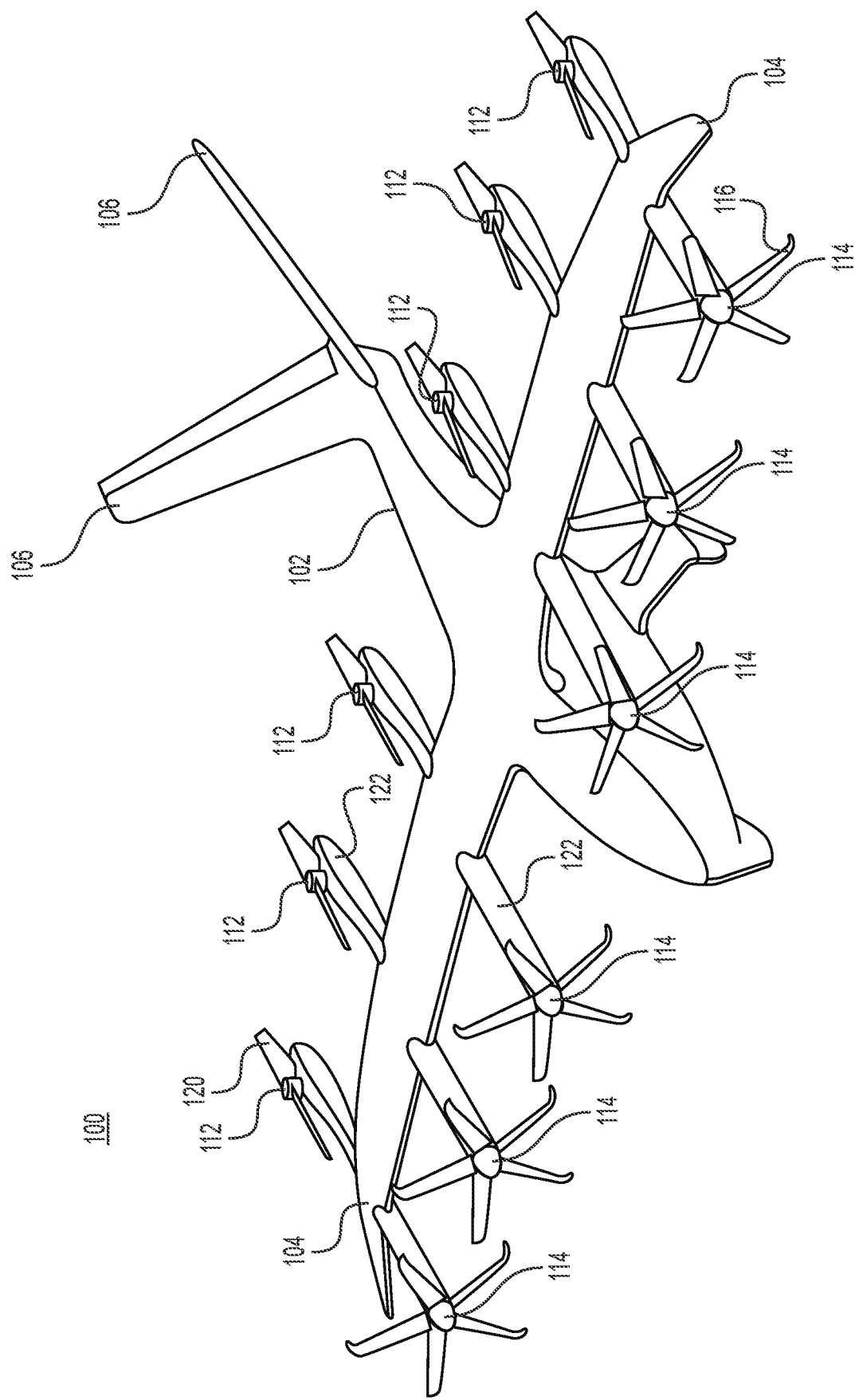
FIG. 1 is an illustration of a perspective view of an exemplary VTOL aircraft, consistent with disclosed embodiments.

The disclosed embodiments provide systems, subsystems, and components for rotor assemblies, and methods of assembly or manufacturing of the same.

The disclosed embodiments provide systems, subsystems, and components for new VTOL aircraft having various combinations of electric propulsion systems and cooling systems that maximize performance while minimizing weight.

In some embodiments, an electric propulsion system as described herein may generate thrust by supplying High Voltage (HV) electric power to an electric engine, which in turn converts HV electric power into mechanical shaft power which is used to rotate a propeller. An aircraft as described herein may include multiple electric engines mounted forward and aft of the wing. The engines may be mounted directly to the wing, or mounted to one or more booms attached to the wing. The amount of thrust each electric engine generates may be governed by a torque command from a Flight Control System (FCS) provided over a digital communication interface to each electric engine. Embodiments may include forward electric engines that are capable of altering their orientation, or tilt. Some embodiments include forward engines that may have a clockwise (CW) direction of rotation or counterclockwise (CCW) direction of rotation. The forward electric propulsion subsystem may consist of a multi-blade adjustable pitch propeller, as well as a variable pitch subsystem.

In some embodiments, an aircraft may include aft electric engines, or lifters, that can be of a clockwise (CW) type or counterclockwise (CCW) type. Some embodiments may include aft electric engines that utilize a multi-blade fixed pitch propeller.

As described herein, the orientation and use of the electric propulsion system components may change throughout the operation of the aircraft. In some embodiments, during vertical takeoff and landing, the forward propulsion systems as well as aft propulsion systems may provide vertical thrust during takeoff and landing. During the flight phases where the aircraft is in forward flight-mode, the forward propulsion systems may provide horizontal thrust, while the aft propulsion system propellers may be stowed at a fixed position to minimize drag. The aft electric propulsion systems may be actively stowed with position monitoring. Some embodiments may include a transition from vertical flight to horizontal flight and vice-versa. In some embodiments, the transitions may be accomplished via the Tilt Propeller System (TPS). The TPS reorients the electric propulsion system between a primarily vertical direction during vertical flight mode to a mostly horizontal direction during forward-flight mode. Some embodiments may include a variable pitch mechanism that may change the forward propulsion system propeller blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing phases. In some embodiments, the aft electric engines are not used for generating thrust during a CTOL mission and the aft propellers are stowed in place to minimize drag.

In some embodiments, an electric engine as described herein may possess design features which mitigate and protect against uncontained fire, such as utilizing non-hazardous quantity of flammable fluid contained in both the tilt and lift engines. For example, in some embodiments, the electric engine may be configured to utilize less than one quart of oil or another flammable fluid. Some embodiments may include the electric engine containing a non-hazardous quantity of air such that any fire may not be capable of maintaining a duration capable of migrating to another portion of the aircraft. In some embodiments, the non-hazardous quantity of air may be in contact with flammable liquids throughout the electric engine. Some examples may include an electric engine possessing up to one liter, two liters, three liters, four liters, five liters, ten liters, or twenty liters of air within the electric engine housing. In some embodiments, the amount of air present within the electric engine housing may possess a fixed ratio to the amount of oil, or other liquid for cooling, present within the electric propulsion system. Such a ratio may be driven by a determination of the sufficient thermal mass needed to properly cool the electric propulsion system. Some embodiments may include a ratio of about 3:1 of air to oil present within the electric propulsion system. Some embodiments may include an electric engine housing where 75% of the open volume, that is, interior volume that is not occupied by components of the electric engine, is comprised of air while 25% of the open volume is comprised of oil or some other liquid for cooling and/or lubricating. Some embodiments may also be configured without a nominal ignition source within the electric engines, possess an engine over temperature operating limit that may be more than 50° C. less than a flammable fluid auto-ignition temperature, possess overtemperature detection and protection, overvoltage detection and protection, and/or possess overcurrent detection and protection. Further, some embodiments may include an electric propulsion system where the bulk temperature of the electric propulsion system is lower than the autoignition temperature and flashpoint of the oil, or other liquid, present within the electric propulsion system in all normal operating conditions. In some embodiments, non-normal conditions that raise the bulk electric propulsion system temperature may result in system responses that prevent the exceedance of the oil, or other liquid, flashpoint and autoignition temperature. In some embodiments, the ratio of air to oil, or other liquid, may be such that if a fire were to occur, including if an arc were to cause a fire, within the electric engine housing, the amount of air present within the electric engine housing would not allow the fire to propagate to other areas of the aircraft. In some embodiments, these and other design features may yield an electric engine that is deemed by one or more guidelines or regulations to not be a designated fire zone.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

A. Exemplary Electric Aircraft Features

Figure 2:
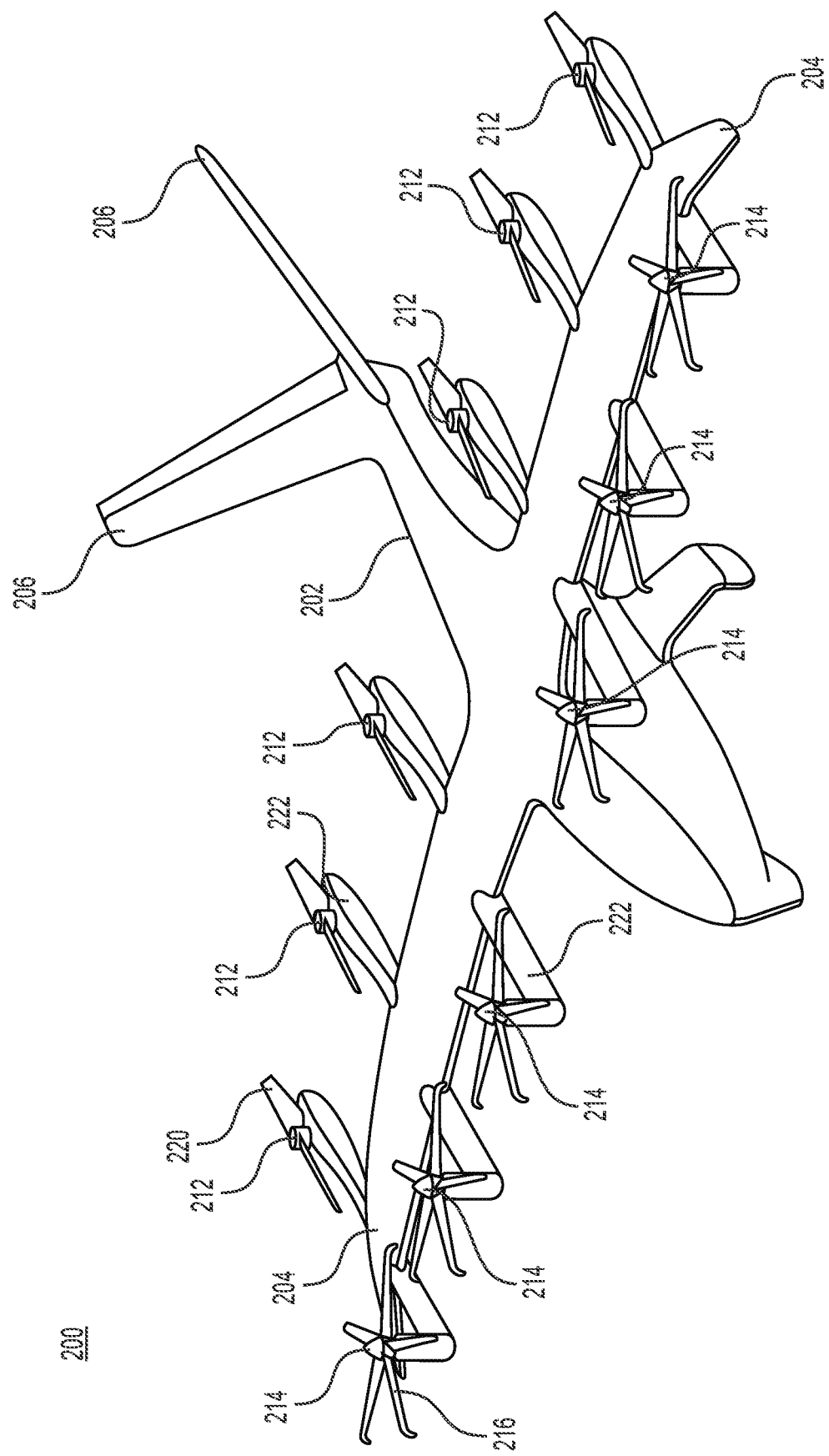
FIG. 2 is another illustration of a perspective view of an exemplary VTOL aircraft in an alternative configuration, consistent with embodiments of the present disclosure.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. Accordingly, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked for cruising in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 and at least a portion of tilt propellers 114, 214 may be located forward of wings 104, 204. In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have designed with a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design. In some embodiments, the wings have a tapering leading edge.

In some embodiments, lift propellers 112, 212 or tilt propellers 114, 214 may canted relative to at least one other lift propeller 112, 212 or tilt propeller 114, 214. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the hub onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Figure 3:
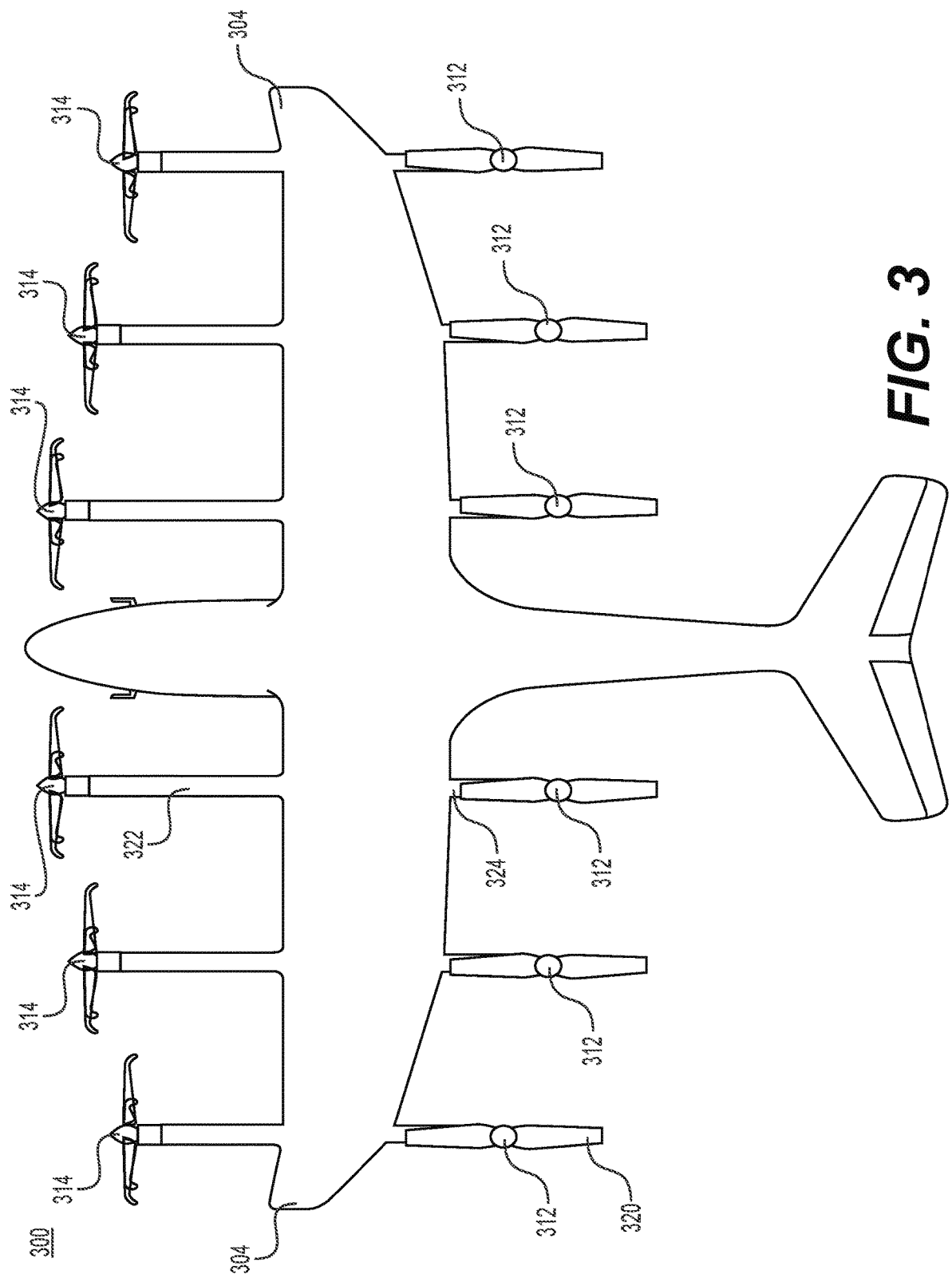
FIG. 3 is an illustration of a top plan view of an exemplary VTOL aircraft, consistent with embodiments of the present disclosure.

FIG. 3 is an illustration of a top plane view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to the lift propeller 312 may comprise a similar rear end of the boom 324 length across the numerous rear ends of the booms. In some embodiments, the length of the rear ends of the booms may vary across the, exemplary, six rear ends of the booms. For example, each rear end of the boom 324 may comprise a different length from the wing 304 to the lift propeller 312, or a subset of rear ends of booms may be similar in length. In some embodiments, a front end of boom 322 may comprise various lengths from the wing 304 to the tilt propeller 314 across the front ends of booms. For example, as shown in FIG. 3, a length of the front end of boom 322 from the tilt propellers 314 nearest the fuselage to the wing 304 may comprise a greater length than the length of the front end of the boom 322 from the wing 304 to the tilt propellers 314 furthest from the fuselage. Some embodiments may include front ends of the booms with similar lengths across the, exemplary, six front ends of booms or any other distribution of lengths of the front ends of booms from the wing 304 to tilt propellers 314. Some embodiments may include an aircraft 300 possessing eight electric propulsion systems with four forward electric propulsion systems 314 and four aft electric propulsion systems 312, or any other distribution of forward and aft electric propulsion systems, including embodiments where the number of forward electric propulsion systems 314 is less than or greater than the number of aft electric propulsion systems 312. Further, FIG. 3 depicts an exemplary embodiment of a VTOL aircraft 300 with forward propellers 314 in a horizontal orientation for horizontal flight and aft propeller blades 320 in a stowed position for a forward phase of flight.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems.

Figure 4:
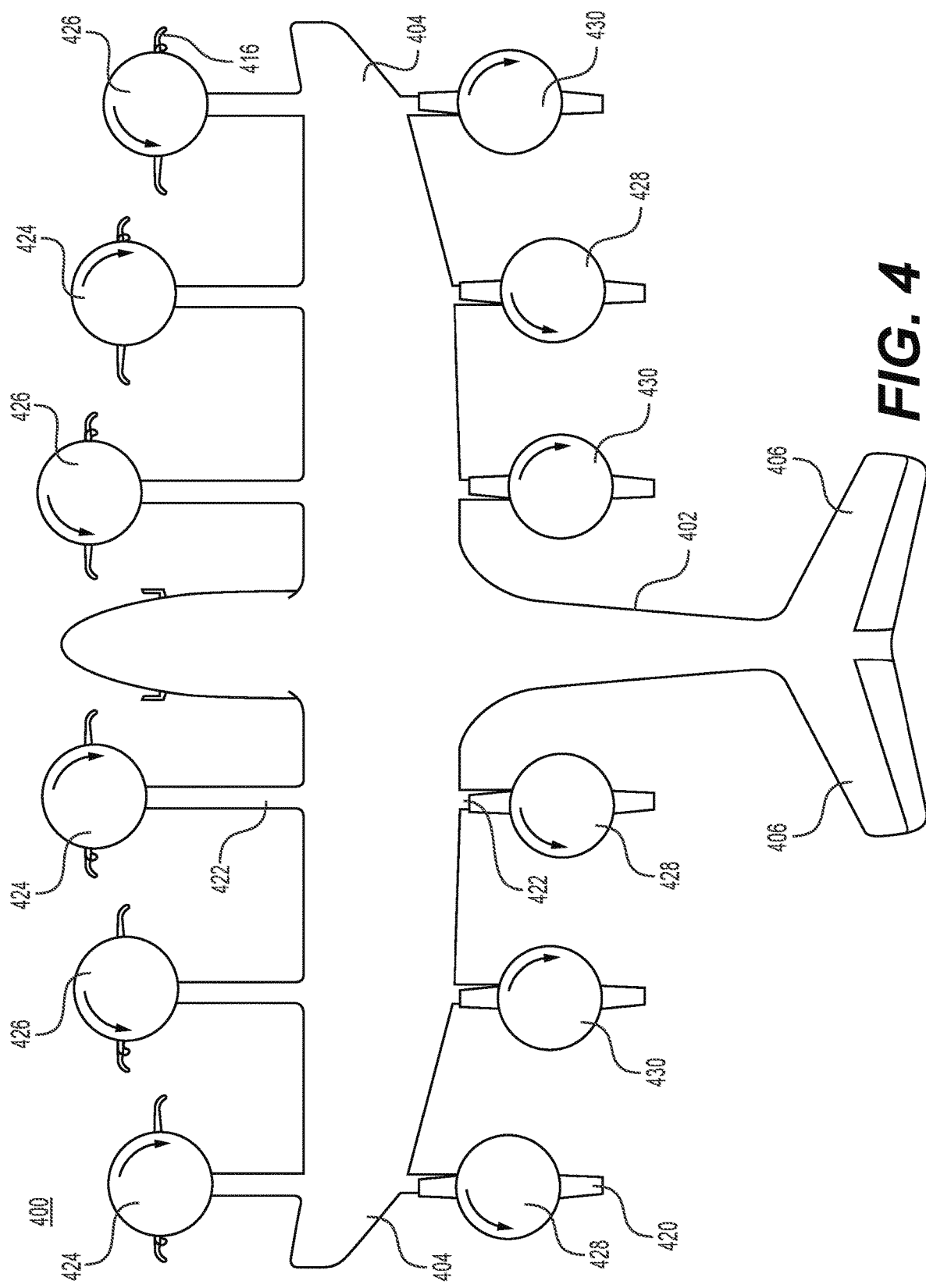
FIG. 4 is a schematic diagram illustrating exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
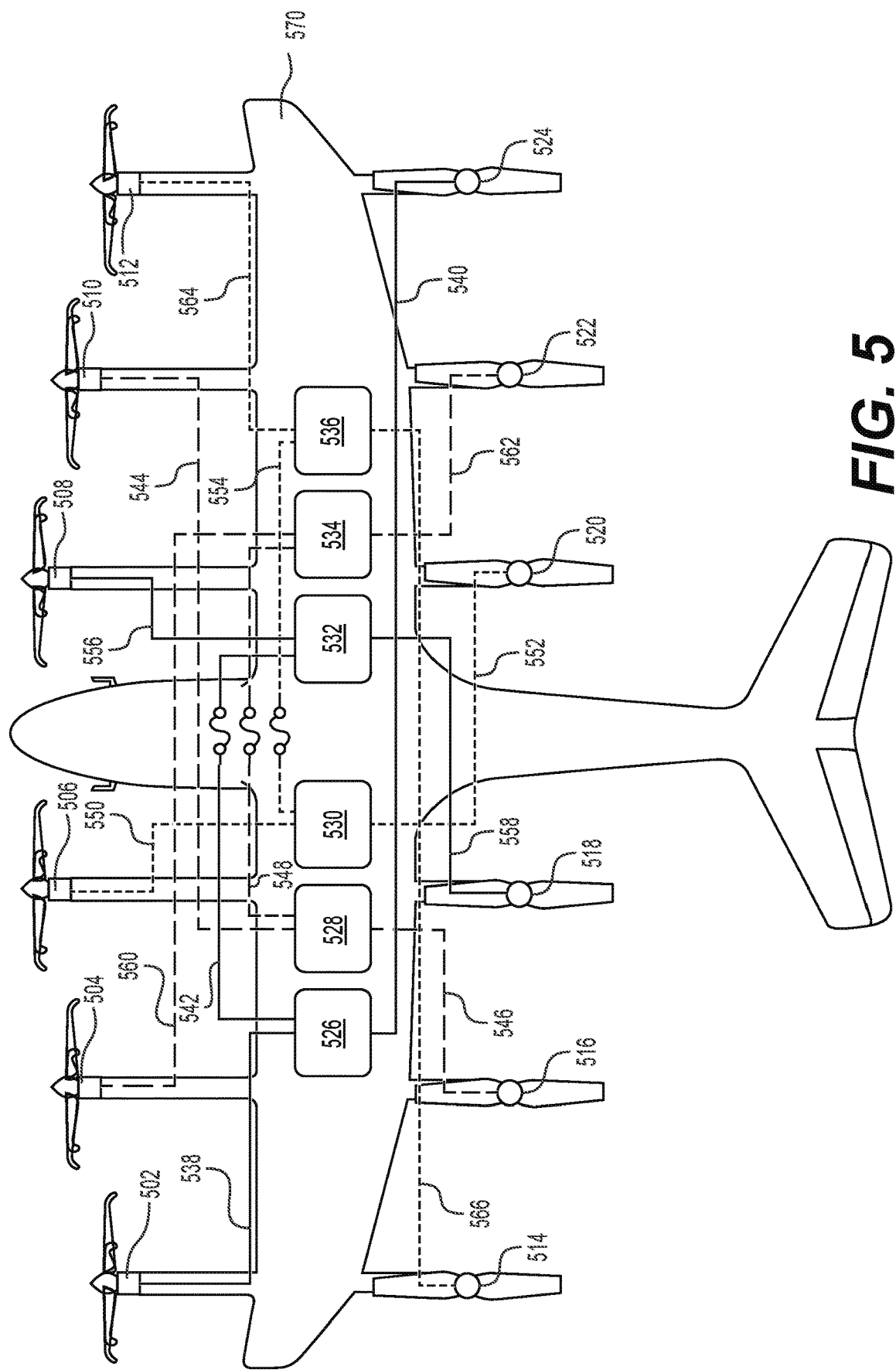
FIG. 5 is a schematic diagram illustrating exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have various power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems, including batteries 526, 528, 530, 532, 534, and 536 stored within the wing 570 of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, a battery may be connected to diagonally opposing electric engines. In such a configuration, first power system 526 may provide power to electric engines 502 via power connection channel 538 and electric engine 524 via power connection channel 540. In some embodiments, first power system 526 may also be paired with a fourth power system 532 via a power connection channel 542 possessing a fuse to prevent excessive current from flowing through the power systems 526 and 532. Further to this embodiment, VTOL aircraft 500 may include a second power system 528 paired with a fifth power system 534 via power connection channel 548 possessing a fuse and may provide power to electric engines 510 and 516 via power connection channels 544 and 546, respectively. In some embodiments, a third power system 530 may be paired with a sixth power system 536 via power connection channel 554 possessing a fuse and may provide power to electric engines 506 and 520 via power connection channels 550 and 552, respectively. The fourth power system 532 may also provide power to electric engines 508 and 518 via power connection channels 556 and 558, respectively. The fifth power system 534 may also provide power to electric engines 504 and 522 via power connection channels 560 and 562, respectively. The sixth power system 536 may also provide power to electric engines 512 and 514 via power connection channels 564 and 566, respectively.

As disclosed herein, an electric propulsion system may include an electric engine connected to a High Voltage Power System, such as a battery, located within the aircraft, via high voltage channels or power connection channels. Some embodiments may include various batteries being stored within an aircraft wing with high voltage channels traveling throughout the aircraft, including the wing and boom, to an electric propulsion system. In some embodiments, multiple high voltage power systems may be used to create an electric propulsion system with multiple high voltage power supplies to avoid the risk of a single point of failure. In some embodiments, an aircraft may include multiple electric propulsion systems that may be wired in a pattern to various batteries or power sources stored throughout the aircraft. It will be recognized that such a configuration may be beneficial as to avoid the risk of a single point of failure where one battery or power source failure could lead to a portion of the aircraft not being able to maintain a required amount of thrust to continue flight or perform a controlled landing. For example, if a VTOL possessed two forward electric propulsion systems and two aft propulsion systems, the forward and the aft electric propulsion systems on opposite sides of the VTOL aircraft may be connected to the same high voltage power system. In such a configuration, if one high voltage power system were to fail, a forward and an aft electric propulsion system on opposite sides of the VTOL aircraft would remain in working order and may provide a more balanced flight or landing compared to a forward and aft electric propulsion system failing on the same side of a VTOL aircraft. Some embodiments may include four forward electric propulsion systems and four aft electric propulsion systems where diagonally opposing electric engines are connected to a common battery or power source. Some embodiments may include various configurations of electric engines electrically connected to high voltage power systems such that a risk of a single point of failure is avoided in the case of a power source failure and the phase of flight during which a failure occurs may continue or the aircraft may perform an alternative phase of flight in response to the failure.

As discussed above, an electric propulsion system may include an electric engine that provides mechanical shaft power to a propeller assembly to produce thrust. In some embodiments, the electric engine of an electric propulsion system may include a High Voltage Power System supplying high voltage power to the electric engines and/or a Low Voltage System supplying low voltage direct current power to an electric engine. Some embodiments may include the electric engine(s) digitally communicating with a Flight Control System ("FCS") comprising Flight Control Computers ("FCC") that may send and receive signals to and from the electric engine including commands and responsive data or status. Some embodiments may include an electric engine capable of receiving operating parameters from and communicating operating parameters to the FCC, including speed, voltage, current, torque, temperature, vibration, propeller position, and any other value of operating parameters.

In some embodiments, a flight control system may include a system capable of communicating with an electric engine to send and receive analog/discrete signals to the electric engine and controlling an apparatus capable of redirecting thrust of the tilt propellers between a primarily vertical direction during vertical flight mode to a mostly horizontal direction during forward-flight mode. In some embodiments, this system may be referred to as a Tilt Propeller System ("TPS") and may be capable of communicating and orienting additional features of the electric propulsion system.

Figure 6:
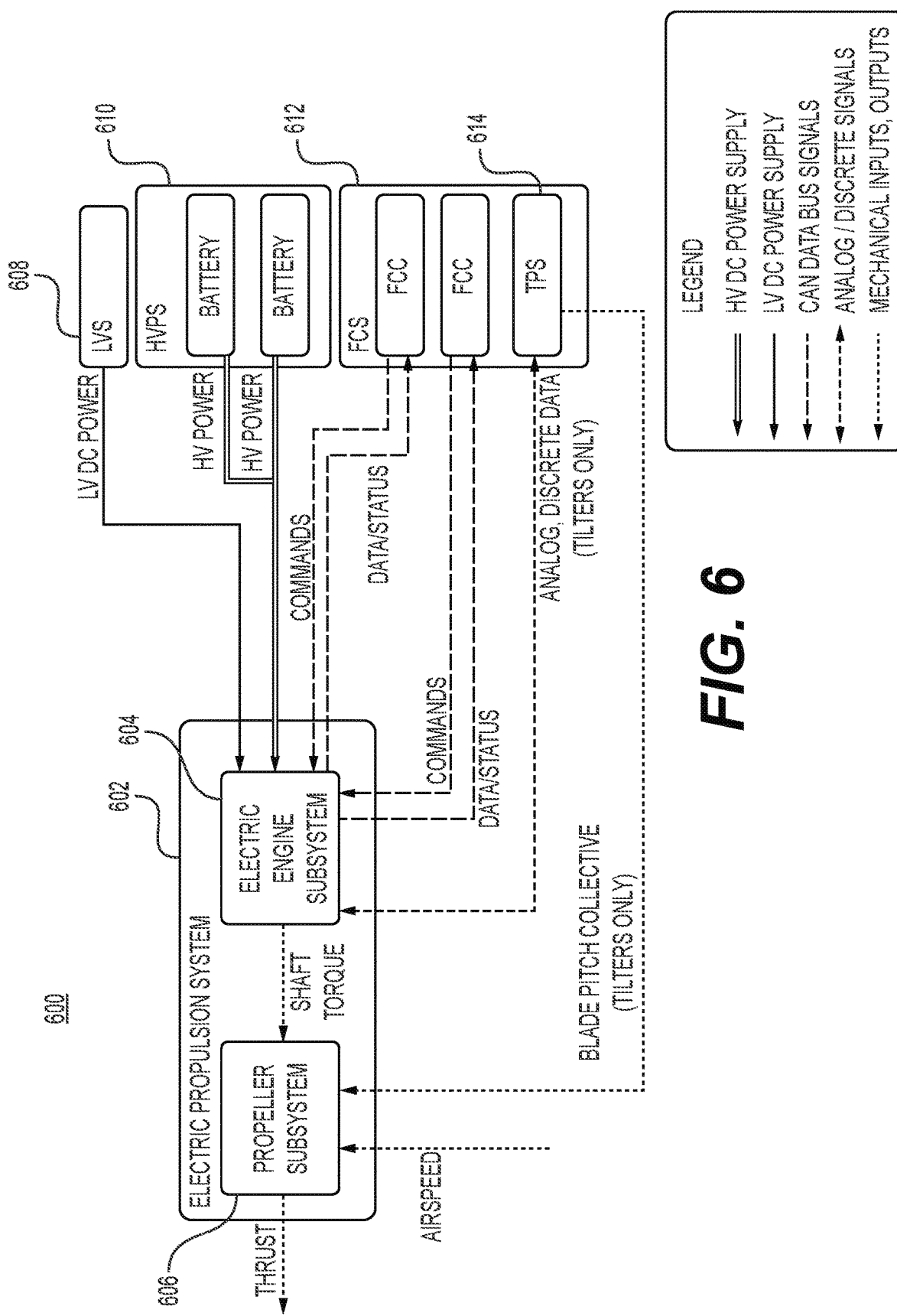
FIG. 6 is a block diagram illustrating an exemplary architecture and design of an electric propulsion unit of a VTOL aircraft, consistent with disclosed embodiments.

FIG. 6 illustrates block diagram of an exemplary architecture and design of an electric propulsion unit 600 consistent with disclosed embodiments. In some embodiments, an electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage DC (LV DC) power from a Low Voltage System (LVS) 608. Some embodiments may include the electric engine subsystem 604 receiving high voltage (HV) power from a High Voltage Power System (HVPS) 610 comprising at least one battery or other device capable of storing energy. In some embodiments, a High Voltage Power System may include more than one battery, or other device capable of storing energy, supplying high voltage power to the electric engine subsystem 604. It will be recognized that such a configuration may be advantageous as to not risk a single point of failure where a single battery failure leads to an electric propulsion system 602 failure.

Some embodiments may include an electric propulsion system 602 including an electric engine subsystem 604 receiving signals from and sending signals to a flight control system 612. In some embodiments, a flight control system 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. In some embodiments, a flight control system 612 may also include a Tilt Propeller System ("TPS") 614 capable of sending and receiving analog, discrete data to and from the electric engine subsystem 604 of the tilt propellers. A tilt propeller system 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606.

As discussed throughout, an exemplary VTOL aircraft may possess various types of electric propulsion systems including tilt propellers and lift propellers, including forward electric engines with the ability to tilt during various phases of flight, and aft electric engines that remain in one orientation and may only be active during certain phases of flight (i.e., take off, landing, and hover).

Figure 7:
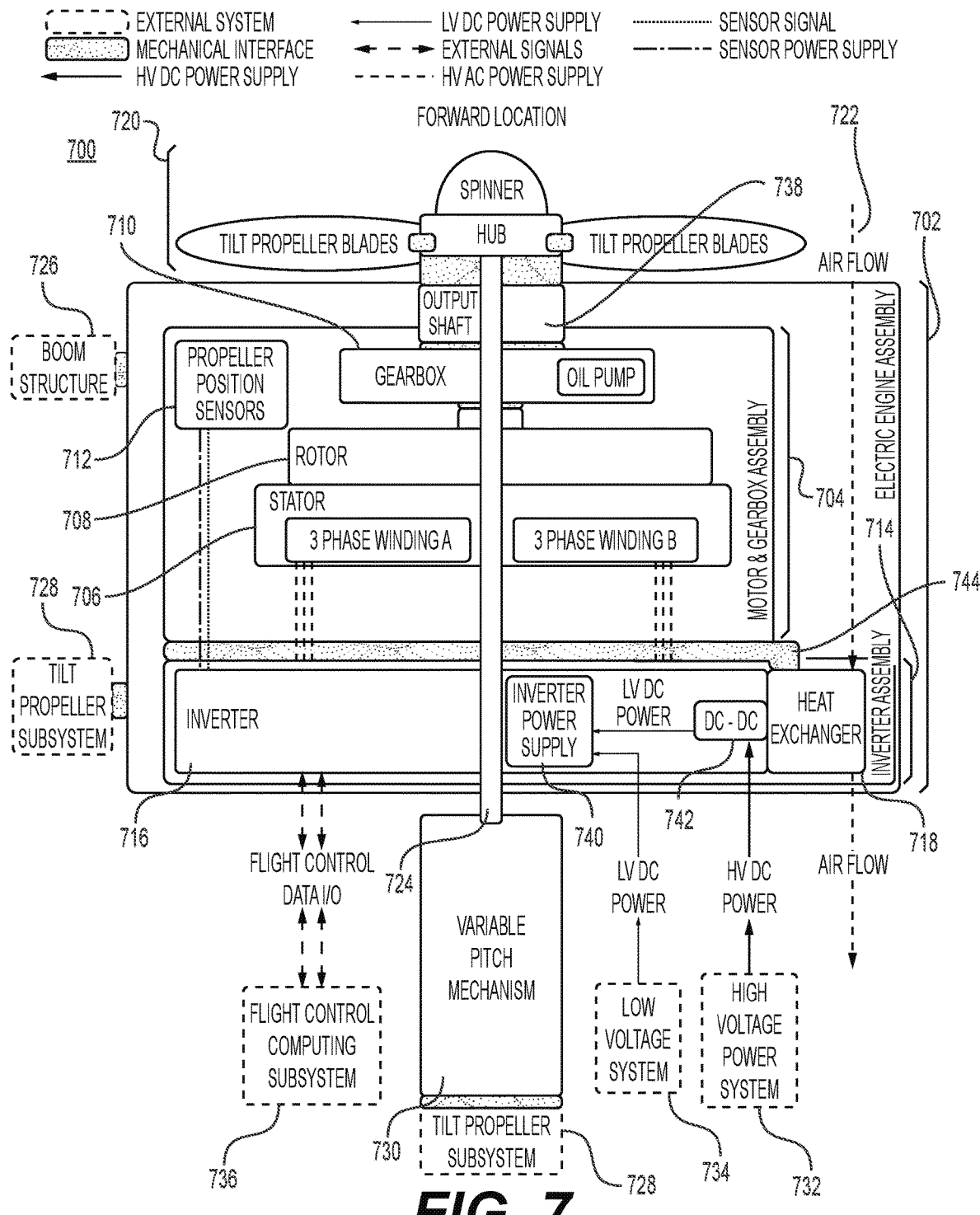
FIG. 7 is a schematic diagram illustrating an exemplary tilt electric propulsion system of a VTOL aircraft, consistent with disclosed embodiments.

FIG. 7 is a schematic diagram illustrating an exemplary tilt electric propulsion system of a VTOL aircraft, consistent with disclosed embodiments. A tiltable electric propulsion system 700 may include an electric engine assembly 702 aligned along a shaft 724 that is connected to an output shaft 738 that is mechanically coupled to a propeller assembly 720 comprising a hub, a spinner, and tilt propeller blades. In some embodiments, an electric engine assembly 702 may include a motor and gearbox assembly 704 aligned along and mechanically coupled to the shaft 724. In some embodiments, a motor and gearbox assembly 704 may include an electric motor assembly comprising a stator 706 and a rotor 708. As shown in FIG. 7, and present in some embodiments, a stator 706 may include multiple stator windings connected to the inverter 716. In such a configuration, a stator 706 may incorporate one or more redundancies so that, in the event one set of windings were to fail, power would still be transmitted to the stator 706 via one or more remaining windings, so that the electric engine assembly 702 retains power and continues to generate thrust at the propeller assembly 720.

In some embodiments, a motor and gearbox assembly 704 may contain a gearbox 710 aligned along the shaft 724 to provide a gear reduction between the torque of the shaft 724 from the electric engine assembly, comprising a stator 706 and rotor 708, and the output shaft 738 Torque applied to the output shaft 738 may be transferred to the propeller assembly 720. Some embodiments may include a gearbox 710 containing an oil pump. In such an embodiment, the oil pump may drive a circulation of oil throughout the motor and gearbox assembly 704 at a speed equivalent to the rotation of the output shaft 738 to cool and lubricate the gearbox and electric motor components. In some embodiments, the oil pump may drive a circulation of oil at a speed greater than or less than the rotation of the output shaft 738. Some embodiments of a motor and gearbox assembly 704 may include propeller position sensors 712 present within the housing that may detect a magnetic field produced by the electric engine assembly to determine a propeller position. Further embodiments may include propeller position sensors 712 that are powered by an inverter 716 and send collected data to an inverter 716.

In some embodiments, an electric engine assembly 702 may also include an inverter assembly 714 aligned along the shaft 724. An inverter assembly 714 may include an inverter 716 and an inverter power supply 740 An inverter power supply 740 may accept low voltage DC power from a low voltage system 734 located outside the electric engine assembly 702. An inverter power supply 740 may accept low voltage DC power originating from a high voltage power system 732, located outside the electric engine assembly 702, that has been converted to low voltage DC power via a DC-DC converter 742. An inverter 716 may supply high voltage alternating current to the stator 706 of the electric engine assembly located within the motor and gearbox assembly 704 via at least one three-phase winding. An inverter assembly 714 may include an inverter 716 that may receive flight control data from a flight control computing subsystem 736.

In some embodiments, a motor and gearbox 704 may be located between an inverter assembly 714 and a propeller assembly 720. Some embodiments may also include a divider plate 744 coupled to the motor and gearbox assembly 704 and inverter assembly 714. A divider plate 744 may create an enclosed environment for an upper portion of the motor and gearbox assembly 704 via an end bell assembly, and create an enclosed environment for a lower portion of the inverter assembly 714 via a thermal plate. In some embodiments, divider plate 744 may serve as an integral mounting bracket for supporting heat exchanger 718. Heat exchanger 718 may comprise, for example, a folded fin or other type of heat exchanger. In some embodiments, the electric propulsion system 700 may circulate oil or other coolant throughout the electric engine assembly 702, motor and gearbox assembly 704, or inverter assembly 714 to transfer heat generated from the components to the oil or other coolant liquid. The heated oil or other coolant liquid may circulate through heat exchanger 718 to transfer the heat to an air flow 722 passing through the fins of the heat exchanger.

In some embodiments, the electric engine assembly 702 may be mounted or coupled to a boom structure 726 of the aircraft. A variable pitch mechanism 730 may be mechanically coupled to the propeller assembly 720. In some embodiments, the variable pitch mechanism may abut on the electric engine assembly 702. In some embodiments, the variable pitch mechanism 730 may be coupled to the variable pitch mechanism 730 such it may be remotely mounted within the boom, wing, or fuselage of the aircraft. In some embodiments, the variable pitch mechanism 730 may include a shaft or component traveling within or adjacent to the shaft 724 to the propeller assembly 720. A variable pitch mechanism 730 may serve to change the collective angle of the forward electric engine's propeller assembly blades as needed for operation during the hover-phase, transition phase, and cruise-phase. Some embodiments may include the electric engine assembly 702 being mechanically coupled to a tilt propeller subsystem 728 that may redirect thrust between a primarily vertical direction during vertical flight mode to a mostly horizontal direction during forward-flight mode. In some embodiments, the tilt propeller subsystem may abut on the variable pitch mechanism 730. Some embodiments may include a tilt propeller subsystem 728 comprising various components located in various locations. For example, a component of the tilt propeller subsystem may be coupled to the electric engine assembly 702 and other components may be coupled to the variable pitch mechanism 730. These various components of the tilt propeller subsystem 728 may work together to redirect the thrust of the tiltable electric propulsion system 700.

Figure 8:
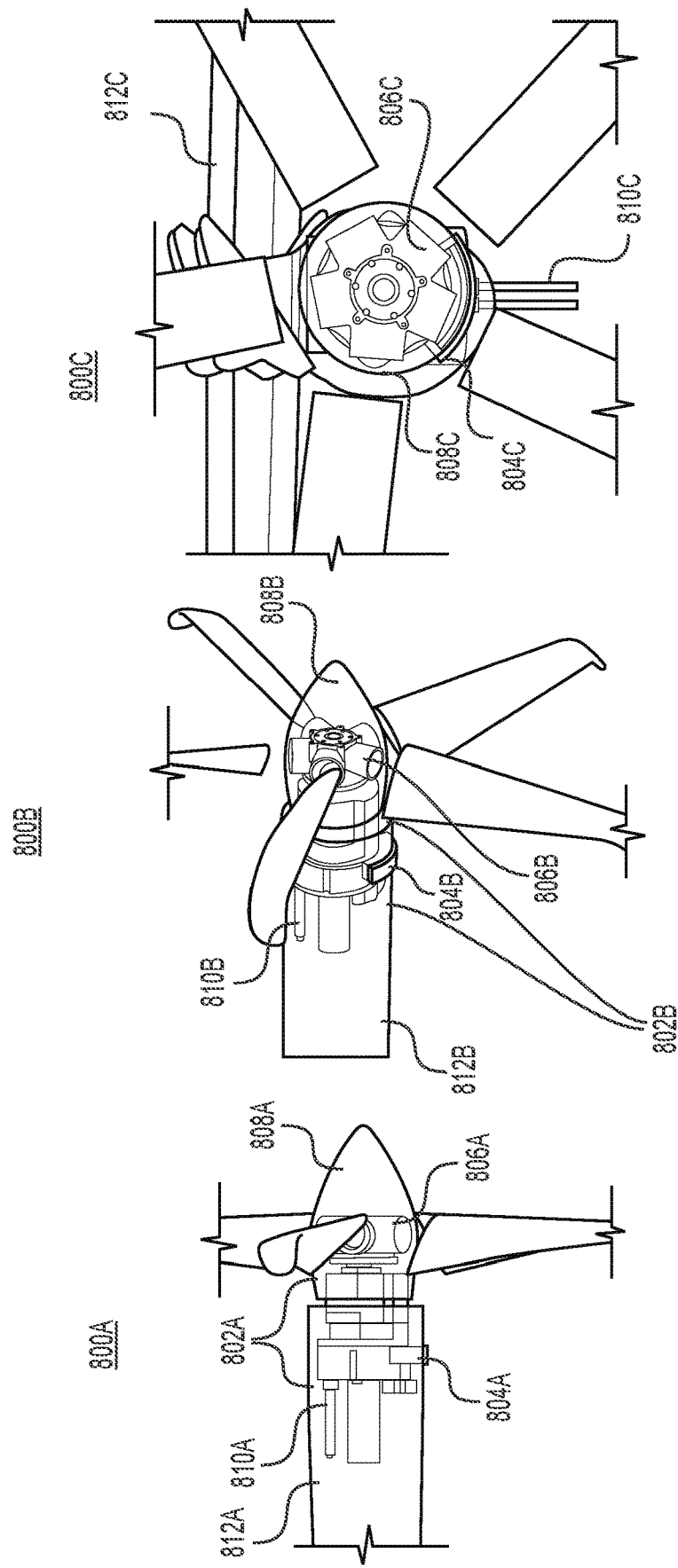
FIGS. 8A-8C are illustrations of an exemplary tilt electric propulsion system of a VTOL aircraft, consistent with disclosed embodiments.

FIGS. 8A-C are illustrations of an exemplary tilt electric propulsion system of a VTOL aircraft, consistent with disclosed embodiments. FIGS. 8A-C possess like numerals and refer to similar elements of tiltable electric propulsion systems 800A, 800B, and 800C. As such, similar design considerations and configurations may be considered throughout the embodiments FIGS. 8A and 8B illustrate a side profile and perspective view, respectively, of a tiltable electric propulsion system 800A, 800B in a cruise configuration integrated into a boom 812A, 812B consistent with this disclosure. A tiltable propeller electric propulsion system 800A, 800B may comprise an electric engine assembly 802A, 802B housed within a boom 812A, 812B of a VTOL aircraft. In some embodiments, a cruise configuration may include the electric engine assembly 802A, 802B being posited within the boom 812A, 812B. An electric engine assembly 802A, 802B may comprise an electric motor assembly, a gearbox assembly, an inverter assembly with power connection channels 810A, 810B, and a heat exchanger 804A, 804B, as described herein. The electric engine assembly 802A, 802B may be mechanically coupled to a propulsion assembly 808A, 808B comprising a shaft flange assembly 806A, 806B, a spinner, and propeller blades.

FIG. 8C illustrates a top-down view, along a spinner 808C, of a tiltable electric propulsion system 800C in a lift configuration integrated into a boom 812B consistent with this disclosure. As shown in FIG. 8C a tiltable electric propulsion system 800C in a lift configuration may comprise the electric engine assembly 802A, 802B being posited outside of the boom 812C and changing its orientation with respect to the boom 812C.

As discussed herein, a lift electric propulsion system may be configured to provide thrust in one direction and may not provide thrust during all phases of flight. For example, a lift system may provide thrust during take-off, landing, and hover, but may not provide thrust during cruise.

Figure 9:
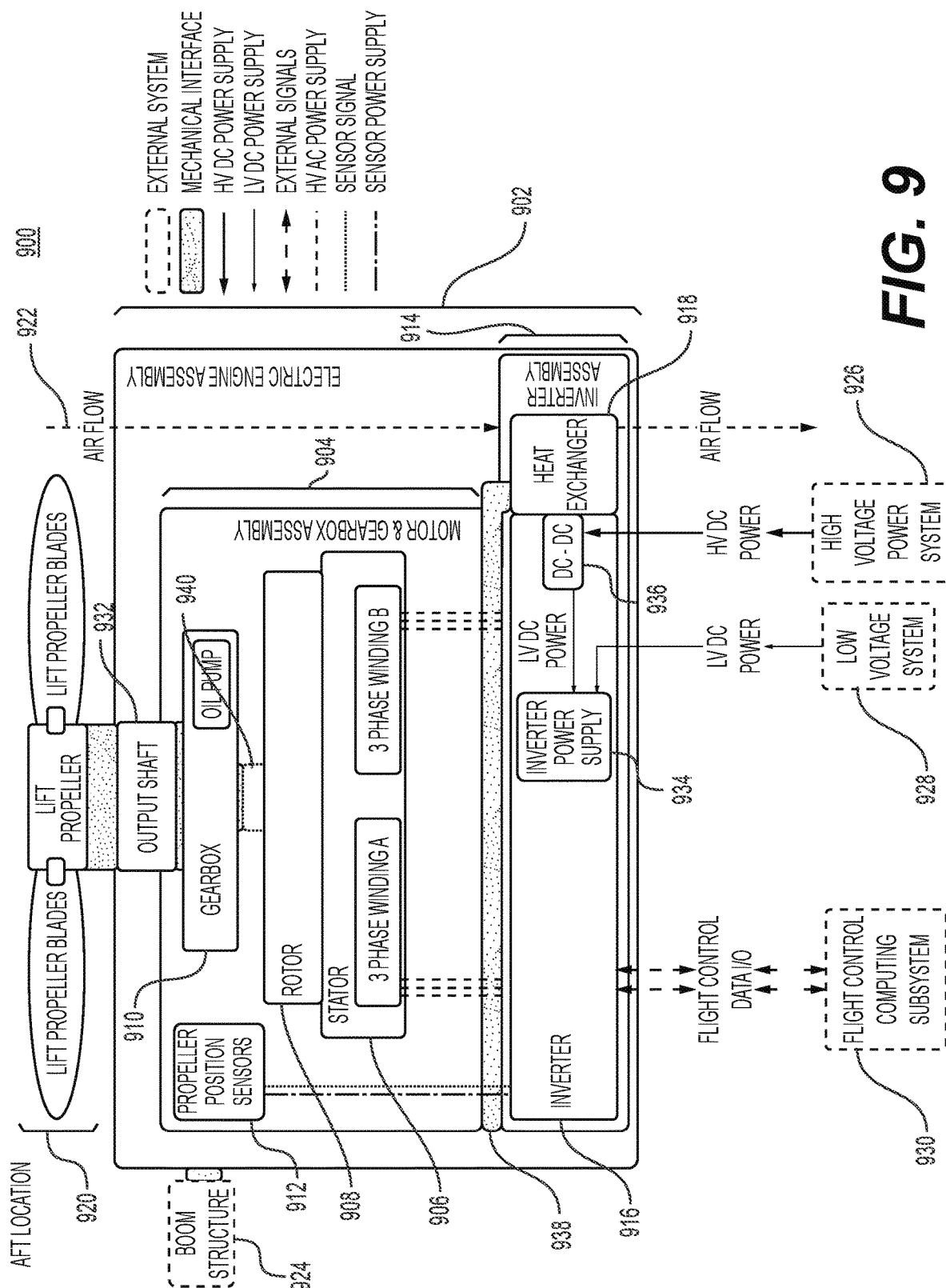
FIG. 9 is a schematic diagram illustrating an exemplary lift electric propulsion system of a VTOL aircraft, consistent with disclosed embodiments.

FIG. 9 is a schematic diagram illustrating an exemplary lift electric propulsion system of a VTOL aircraft, consistent with disclosed embodiments. A lift electric propulsion system 900 may be mounted or coupled to a boom structure 924 of the aircraft. A lift electric propulsion system 900 may include electric engine assembly 902 aligned along a shaft 940 that is connected to an output shaft 932 that is mechanically coupled to a propeller assembly 920 comprising a hub and tilt propeller blades. In some embodiments, an electric engine assembly 902 may include a motor and gearbox assembly housing 904 aligned along and mechanically coupled to the shaft 940. In some embodiments, a motor and gearbox assembly housing 904 may include an electric motor assembly comprising a stator 906 and a rotor 908. A stator 906 may include multiple stator windings connected to the inverter 916. In such a configuration, a stator 906 may incorporate one or more redundancies and backup measures to avoid a single point of failure in the case. For example, stator 906 may include multiple windings such that, if a winding fails, power may continue to be transmitted to the stator 906 via remaining windings, allowing the electric engine assembly 902 to retain power and continue to generate thrust at the propeller assembly 920.

In some embodiments, a motor and gearbox assembly housing 904 may contain a gearbox 910 aligned along the shaft 940 to provide a gear reduction between the torque of the shaft 932 from the electric engine assembly, comprising a stator 906 and rotor 908, and the output shaft 932. Torque applied to the output shaft 932 may be transferred to the propeller assembly 920. Some embodiments may include a gearbox 910 containing a fluid pump for circulating cooling and/or lubrication fluid. In the embodiment shown, the fluid pump is an oil pump. In such an embodiment, the oil pump may drive a circulation of oil throughout the motor and gearbox assembly housing 904 at a speed equivalent to the rotation of the output shaft 932 to cool and lubricate the gearbox and electric motor components. Some embodiments of a motor and gearbox assembly housing 904 may include propeller position sensors 912 present within the housing that may detect a magnetic field produced by the electric engine assembly to determine a propeller position. Further embodiments may include propeller position sensors 912 that are powered by an inverter 916 and send collected data to an inverter 916 that may be transferred to a flight control computing system 930 among other flight control data.

In some embodiments, an electric engine assembly 902 may also include an inverter assembly housing 914 aligned along an axis sharing the axis of the shaft 924. An inverter assembly housing 914 may include an inverter 916 and an inverter power supply 934. An inverter power supply 934 may accept low voltage DC power from a low voltage system 928 located outside the electric engine assembly 902. An inverter power supply 934 may accept low voltage DC power originating from a high voltage power system 926, located outside the electric engine assembly 902, that has been converted to low voltage DC power via a DC-DC converter 936. An inverter 916 may supply high voltage alternating current to the stator 906 of the electric engine assembly located within the motor and gearbox assembly housing 904 via at least one three-phase winding. An inverter assembly 914 may include an inverter 916 that may send data to and receive data from a flight control computing subsystem 930.

In some embodiments, a motor and gearbox housing 904 may be located between an inverter assembly housing 914 and a propeller assembly 920. Some embodiments may also include a divider plate 938 coupled to the motor and gearbox assembly housing 904 and inverter assembly housing 914. A divider plate 938 may create an enclosed environment for an upper portion of the motor and gearbox assembly housing 904 via an end bell assembly, and may create an enclosed environment for a lower portion of the inverter assembly housing 914 via a thermal plate. In some embodiments, a divider plate 938 may serve as an integral mounting bracket for supporting heat exchanger 918. Heat exchanger 918 may comprise, e.g., a folded fin or other type of heat exchanger. In some embodiments, the electric propulsion system 900 may circulate oil or other coolant fluid throughout the electric engine assembly 902, motor and gearbox assembly 904, or inverter assembly 914 to transfer heat generated from the components to the oil or other coolant liquid. The heated oil or other coolant liquid may be circulated through heat exchanger 918 to transfer the heat to an air flow 922 passing through the fins of the heat exchanger.

In some embodiments, a tiltable electric propulsion system and a lift electric propulsion system may possess similar components. This may be advantageous with respect to many design considerations present within VTOL aircrafts. For example, from a manufacturability standpoint, different types of electric propulsion systems having similar components may be beneficial in terms of manufacturing efficiency. Further, having similar components may be beneficial in terms of risk management as similar components possess similar points of failure and these points of failure may be well explored and designed around when comparing systems having similar components to systems having different components and configurations.

While a tiltable electric propulsion system may possess additional, and in some embodiments different, components compared to a lift electric propulsion system, it should be understood that in some embodiments a tiltable electric propulsion system and a lift electric propulsion system may possess the same configuration of components. For example, in some embodiments, a tiltable and lift electric propulsion system may contain the same components while the lift electric propulsion system may be coupled to a boom, wing, or fuselage of the aircraft such that it may not be able to provide thrust in as many directions as tiltable electric propulsion system.

Figure 10:
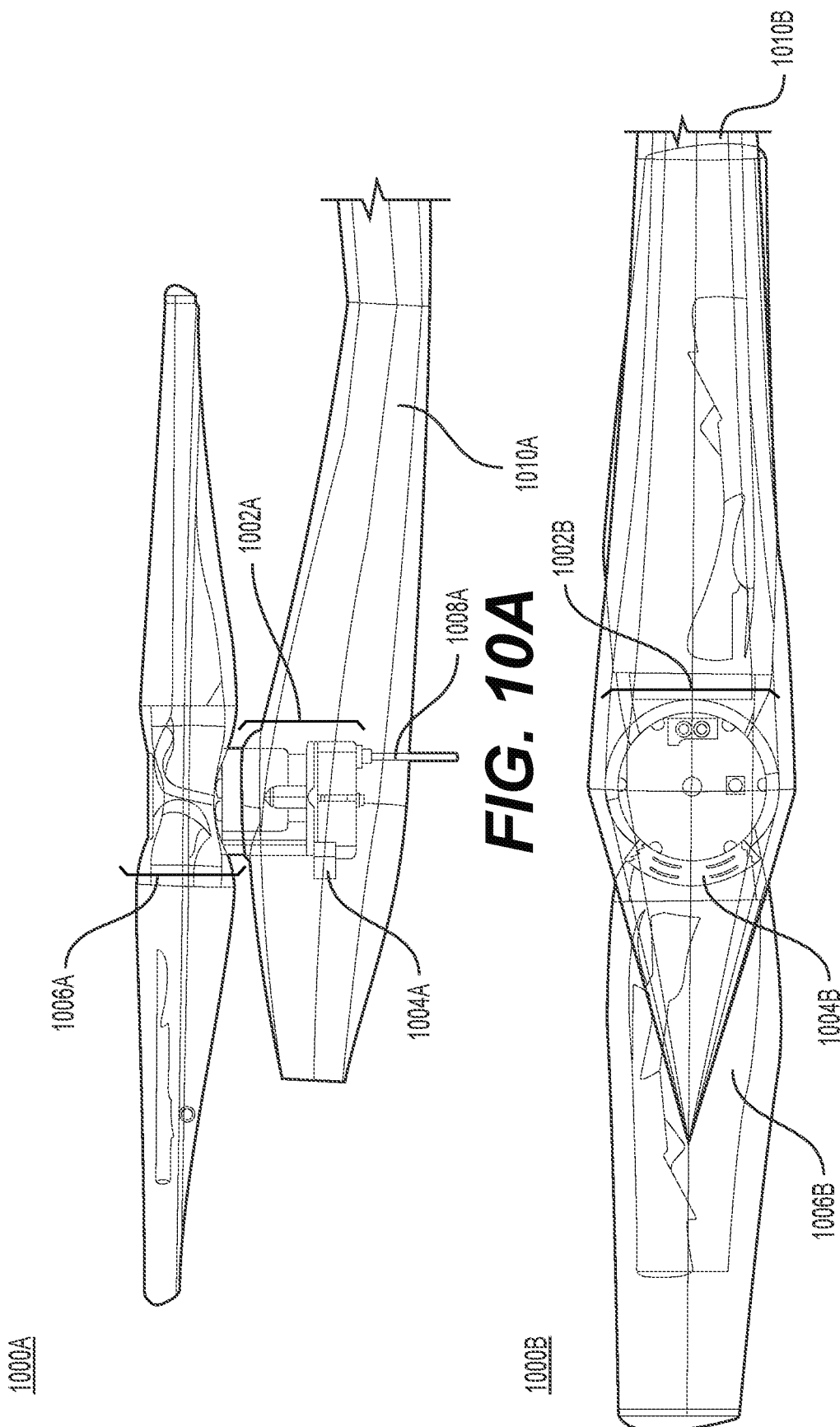
FIGS. 10A-10B are illustrations of an exemplary lift electric propulsion systems of a VTOL aircraft, consistent with disclosed embodiments.

FIGS. 10A-B are illustrations of an exemplary lift electric propulsion systems of a VTOL aircraft, consistent with disclosed embodiments. FIGS. 10A and 10B possess like numerals and refer to similar elements of lift electric propulsion systems 1000A and 1000B. As such, similar design considerations and configurations may be considered throughout the embodiments FIG. 10A illustrates a side profile of a lift electric propulsion system 1000A in a lift configuration integrated into a boom 1010A consistent with this disclosure. A lift electric propulsion system 1000A may comprise an electric engine assembly 1002A housed within a boom 1010A of a VTOL aircraft. In some embodiments, a lift configuration may include the electric engine assembly 1002A being posited vertically within the boom 1010A. An electric engine assembly 1002A may comprise an electric motor assembly, a gearbox assembly, an inverter assembly with power connection channels 1008A, and a heat exchanger 1004A, as described herein. The electric engine assembly 1002A may be mechanically coupled to a propulsion assembly 1006A comprising a shaft flange assembly and propeller blades.

FIG. 10B illustrates a top-down view of a lift electric propulsion system 1000B in a lift configuration integrated into a boom 1010B, consistent with this disclosure.

Some embodiments of the disclosed electric engine may generate heat during operation and may comprise a heat management system to ensure components of the electric engine do not fail during operation. In some embodiments, coolant may be used and circulated throughout individual components of the engine, such as an inverter, gearbox, or motor, through some of the components, or through all of the components of the engine to assist with managing the heat present in the engine. Some embodiments may include using air cooling methods to cool the electric engine or using a mixture of coolant and air to manage the heat generated during operation in the electric engine. In some embodiments, the coolant being used may also be the same liquid that is being used as lubricant throughout the inverter, gearbox, or motor. For example, components of the electric engines may be cooled using a liquid or air or using a mixture of air and liquid cooling. As another example, a motor may be cooled using air cooling while the inverter and gearbox are cooled using liquid cooling. It should be understood that a mixture of cooling may be used for any combination of electric engine components or within each component.

In some embodiments, oil may be used as a lubricant throughout an electric engine and may also be used as coolant fluid to assist in managing the heat generated by the engine during operation. Further to this example, different amounts of oil may be used to act as both lubricant and coolant fluid in the electric engine, such as less than or equal to one quart, 1.5 quarts, two quarts, 2.5 quarts, three quarts, five quarts or any other amount of oil needed to lubricate and cool the electric engine, in combination with or without the assistance of air cooling. In some embodiments, the amount of the oil or liquid to be used in the system in relation to cooling may be determined based on an amount of thermal mass needed to drive heat transfer from the components of the electric propulsion system. As has been disclosed herein, an electric engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. In some embodiments, the amount of oil or liquid for cooling may be of an appropriate amount to provide sufficient thermal mass to drive heat transfer from the components of the electric propulsion system no matter the orientation of the electric propulsion system. The embodiments discussed herein are exemplary, non-limiting, and do not dictate the bounds of the amount of lubricant and coolant that may be used in an electric engine.

Some embodiments may use oil to lubricate the electric engine and to cool the electric engine. Such embodiments may require additional volumes of oil. In such embodiments, the additional oil may allow for removal of traditional components that may be used to cool such an electric engine. For example, if the electric engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Some embodiments of electric engines may include various components for monitoring flammable fluids, and for preventing ingress of flammable materials into certain sections of the electric engine. Some embodiments may include an electric engine possessing a wet zone enclosure that may be defined by a gearbox, motor, and/or heat exchanger. In some embodiments, an electric engine may possess up to 4 liters, or more, of air within the motor-gearbox housing which is in contact with engine oil. Embodiments of a motor-gearbox housing may equalize internal and external pressure using a breather. Embodiments of a breather may include it protruding above nearby design features to prevent inadvertent entry of external fluids. Some embodiments may include a breather that possesses a screen and a circuitous entry path to prevent entry of external debris. Embodiments may include a sight glass being present on both the tilt and lift electric engines in order to check that oil is not overfilled or underfilled during servicing.

Some embodiments of electric engines may include active protection features in the forward and aft electric engines such as monitoring vibration throughout the engine and internal temperatures such as oil temperature, stator winding set temperature, inverter bulk capacitor temperature, power module temperature, control board power module temperature, control board control processor temperature, control board monitor processor temperature, internal hot-spot temperatures, and other various operating conditions throughout the engine as needed. Such monitoring may be accomplished using various sensors positioned throughout the electric propulsion system and aircraft. Embodiments may include vibration limits based on known failure points or resonances of components and overtemperature limits set based on known failure temperatures and operating limits in relation to auto-ignition temperatures of fluids. In some embodiments, the various sensors used to monitor the operating conditions throughout the engine may report operating conditions to the flight control system. Some embodiments may include a threshold operating value that may be required before an operating value is sent to, or flagged by, the flight control system. In some embodiments, a flight control system may, in response to detecting an operating condition, act to reduce the amount of power directed to an electric propulsion system. Some embodiments may include reducing the amount of power to an electric propulsion system to reduce mechanical wear or friction sparks from vibrations and/or reducing power in an effort to reduce the temperature of components present within the electric propulsion system. Further, some embodiments may include reducing power to an electric propulsion system where a detected efficiency of an inverter is less than a targeted efficiency. In some embodiments, for example where twelve electric propulsion systems are present within the aircraft, a flight control system may act to reduce power, or terminate power, to a single electric propulsion system while increasing the power directed to the remaining electric propulsion systems, or a subset thereof, to counter reduction in lift produced by the one electric propulsion system. In some embodiments, the flight control system may establish various thresholds of operating conditions to correspond with the reduction or increase of power to an electric propulsion system.

Some embodiments may include a High Voltage Power System that may have fuses at the high voltage battery terminals which may rapidly and irreversibly disconnect the engine electrical connection to mitigate and avoid overcurrent events. Such overcurrent protection may be activated when the electric engine current draw is greater than the Overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter may detect AC overcurrent and isolate the erroneous phase and/or will continuously monitor input DC voltage, and will apply protective actions to keep voltages under the overvoltage operating limit.

During takeoff, landing, hover and cruise, motors and related control components of the VTOL aircraft may generate heat. The heat must be dissipated to prevent degradation or damage to the motor, control components and other elements of the VTOL aircraft. For some types of VTOL aircraft, such as electric VTOL (eVTOL) aircraft, thermal control is likewise important to maintain optimal energy efficiency of, e.g., battery-powered components.

Some elements may generate high thermal loads only during certain operational periods. For example, some lift propellers may be used only during takeoff, landing, and hover, and may be shut off during cruise. Therefore, such lift propellers may generate a high thermal load during takeoff, landing, and hover, and generate little or no heat during cruise.

B. Exemplary Rotor Assembly Embodiments

In some embodiments, at least one electrical engine may be mechanically connected directly or indirectly to a fuselage of the aircraft and electrically connected to an electrical power source. Mechanically connected may involve fastened, attached, coupled, fixed, or joined. Connected directly may include the electrical engine connected to the fuselage such that the electrical engine contacts or abuts the fuselage. Connected indirectly may include the electrical engine connected to the fuselage such that there may be intermediary components between the fuselage and the electrical engine, such as a wing, boom, or other intermediary components.

In some embodiments, an electrical propulsion system may include a gearbox assembly. A gearbox may assist in a gear reduction for an electric propulsion system. A gearbox assembly may include multiple sets of gearboxes. For example, in some embodiments, the output of a gearbox assembly may be fed into another gearbox assembly to achieve a greater gear reduction. Such embodiments may include at least one sun gear, at least one set of planetary gears, at least one ring gear, and at least one planetary carrier. The gearboxes may possess common gears such as a common sun gear, a common set of planetary gears, and/or a common ring gear. In some embodiments, a sun gear may be a central gear in a planetary or epicyclic gear system. In some embodiments, a sun gear may be an input gear. The embodiments discussed herein may be modified to include multiple sets of gearboxes. In some embodiments, the combination of using a sun gear, planetary gears, including compound planetary gears, and a ring gear, may produce a gear reduction. As such, properties of the gears within the gearbox assembly may determine the gear reduction available in the electric propulsion system. In some embodiments, a gear reduction value may be a relevant design criteria for VTOL aircrafts as an aircraft may require a specific value of torque to be applied to the propeller assembly to accomplish providing a desired or required lift for a payload. A gearbox may assist in providing torque while minimizing electric engine drag profile and mass. As such, embodiments as described herein may provide optimized electric propulsion system design in terms of drag profile and mass versus payload capabilities.

In some embodiments, an electrical propulsion system may include an electrical motor having a stator and a rotor assembly. For example, the electric engine may drive rotation of a rotor which may drive the rotation of a gearbox providing gear reduction to a shaft in an electric propulsion system. In some embodiments, the rotor may include a plurality of magnets. Electromagnetic interaction between the stator and the rotor may drive rotation of a rotor, and consequently, magnets in the rotor may experience centrifugal force. It will be recognized that at certain rotational speeds, magnets may separate from the rotor due to the centrifugal force. For example, the centrifugal force may cause the magnets to move radially outward such that the magnets become spaced apart from the rotor such that there may be a distance between the rotor and the magnets, which may be detrimental to electromagnetic properties of the rotor. As such, magnets may be retained to prevent them from separating from the rotor. In some embodiments, a rotor assembly may include a sleeve. A sleeve may retain, wrap, surround, enclose, or hold one or more objects. For example, a sleeve may include a wrapper, jacket, cover, casing, or shell. As discussed herein, disclosed embodiments may involve a stretchable sleeve capable of expanding or stretching in diameter or circumference. Premade sleeves may include stretchable sleeves, such as carbon fiber sleeves.

Figure 11:
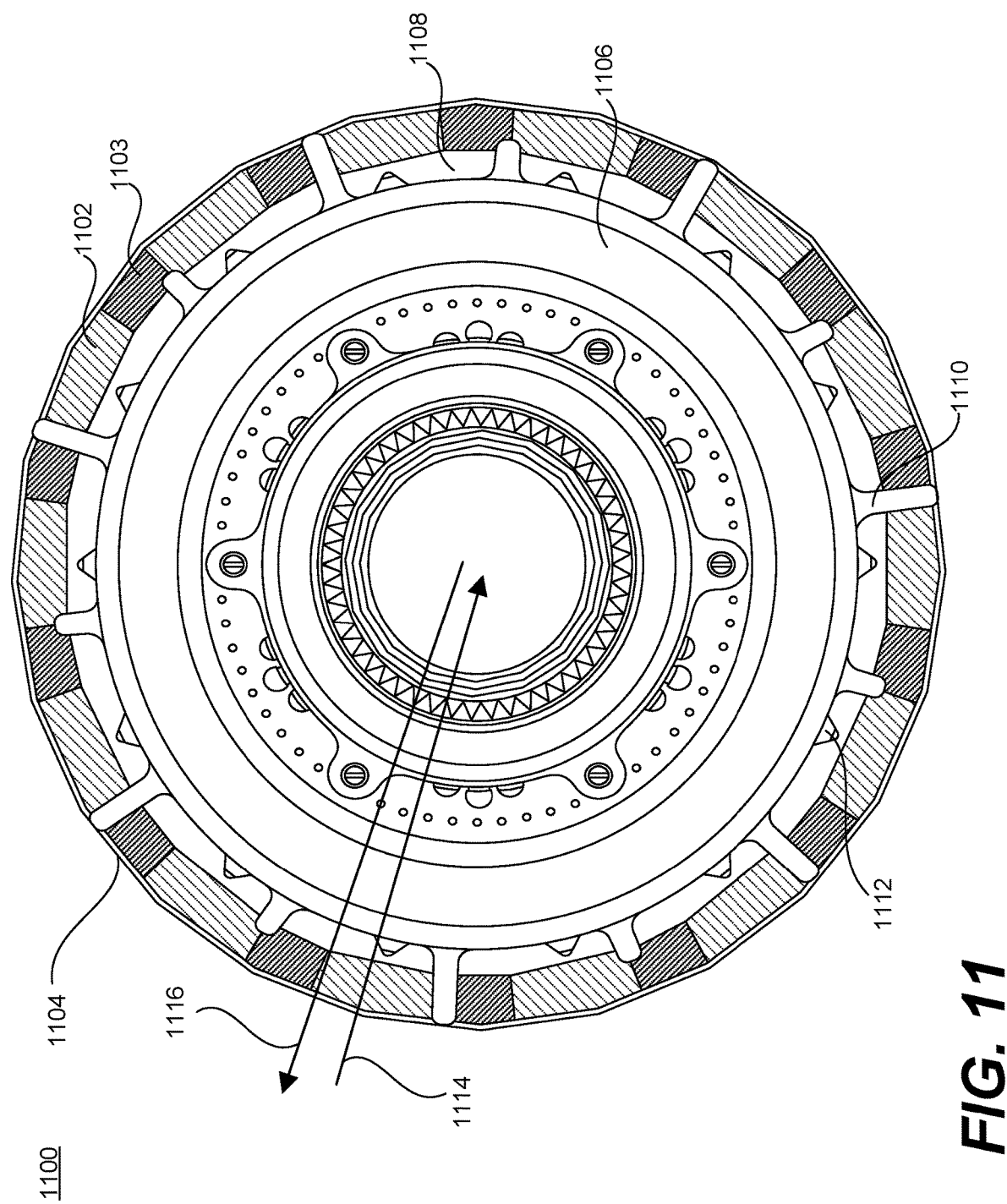
FIG. 11 is an illustration of a rotor assembly, consistent with disclosed embodiments.

FIG. 11 illustrates a rotor assembly 1100, consistent with embodiments of the present disclosure. Rotor assembly 1100 may include sleeve 1104 configured to circumferentially enclose permanent magnets 1102, 1103 that may be attached to a lamination core 1108. Rotor assembly 1100 may also include rotor hub 1106. In some exemplary embodiments, rotor hub 1106 may retain the lamination core 1108, magnets 1102, and/or the sleeve 1104. Rotation of the rotor may cause the magnets to be subjected to centrifugal force in a direction 1116 which may tend to shift or separate the magnets 1102, 1103 from rotor hub 1106. Some embodiments may involve using material with elastic properties to prevent the magnets from separating from the rotor. Some alternate embodiments may utilize direct winding of materials such as carbon fiber. For example, magnets 1102/1102 may be attached to lamination core 1108 and carbon fibers may be circumferentially wound directly around the magnets. It will be recognized that conventional systems may include the use of adhesives such as glue to attach the magnets to the lamination core. The winding of the carbon fibers may occur under high tension to stretch the fibers to result in preload, or pressure, applied to the magnets which may help push the magnets against the lamination core 1108, preventing the magnets 1102, 1103 from separating. It will be recognized that higher tension in the carbon fibers may generate a higher preload, which may be more effective in applying pressure to the magnets and preventing the magnets from separating from the rotor at operational speeds. For example, operational speeds may include high rotational speeds, which may result in higher centrifugal force and thereby necessitating more preload. It will be appreciated that such rotor assemblies may be utilized in various fields, including but not limited to flywheels, automotive, turbocharging, electric motors, and other fields.

As discussed herein, centrifugal force due to the rotation of the rotor may deflect masses such as magnets away from the axis of rotation of the rotor. Disclosed embodiments may include a sleeve (e.g., sleeve 1104) which may retain the magnets and prevent magnets from separating from the rotor. The sleeve may be stretchable and a diameter of the sleeve may increase when the plurality of magnets are positioned circumferentially around the sleeve. In some embodiments, to prevent the magnets from separating from the rotor during rotation, the sleeve may apply a force sufficient to compensate for centrifugal forces, such as centrifugal forces expected at operational rotational speeds. For example, because the sleeve stretches when the magnets are arranged in the sleeve, the tension in the sleeve may cause a force to be applied on the magnets in an opposing direction (e.g., radially inward) to the centrifugal force (e.g., which may be radially outward). The sleeve may apply force on the magnets by preloading the magnets against the rotor. For example, the sleeve may apply a force on the magnets, causing the magnets to abut on the rotor.

In some embodiments, a rotor assembly may include a plurality of tapered magnets. A tapered magnet may involve a magnet with a dimension that narrows, diminishes, or gradually lessens in size. For example, a tapered magnet may have a first length or width and a second length or width, with the second length of width being smaller than the first. In some embodiments, the amount of taper may be determined by properties of the rotor assembly such as the dimensions of the rotor, the amount of expansion in the sleeve needed, and the amount of pressure or force desired to be generated in the sleeve. The angle or amount of taper may influence the amount of circumferential displacement, and therefore the amount of stretch in the sleeve, obtained as the magnets are arranged circumferentially within the sleeve. As an example, a tapered magnet may have a trapezoidal shape, with an incline of 0.6 degrees. A plurality of tapered magnets may include one or more permanent magnets. In some embodiments, tapered magnets may provide advantages including reducing gaps between magnets, thereby improving balance in the rotor assembly.

In some embodiments as illustrated in FIG. 11, the plurality of magnets may abut one another. For example, magnets 1102 may correspond to a first set of magnets, and may contact magnets 1103, which may correspond to a second set of magnets. It will be appreciated that tension in the sleeve 1104 applies pressure on magnets 1102 to prevent magnets 1102 from separating from lamination core 1108. For example, tension in sleeve 1104 may apply preload or retention force in a direction 1114 opposing the direction 1116 of centrifugal force. It will be appreciated that disclosed embodiments including tension in sleeve 1104 may reduce the use of adhesives such as glue, thereby enabling simpler assembly. For example, it will be appreciated that utilizing tension in the sleeve may provide higher preload and thereby improved retention of magnets compared to retention provided by adhesives.

Figure 12A:
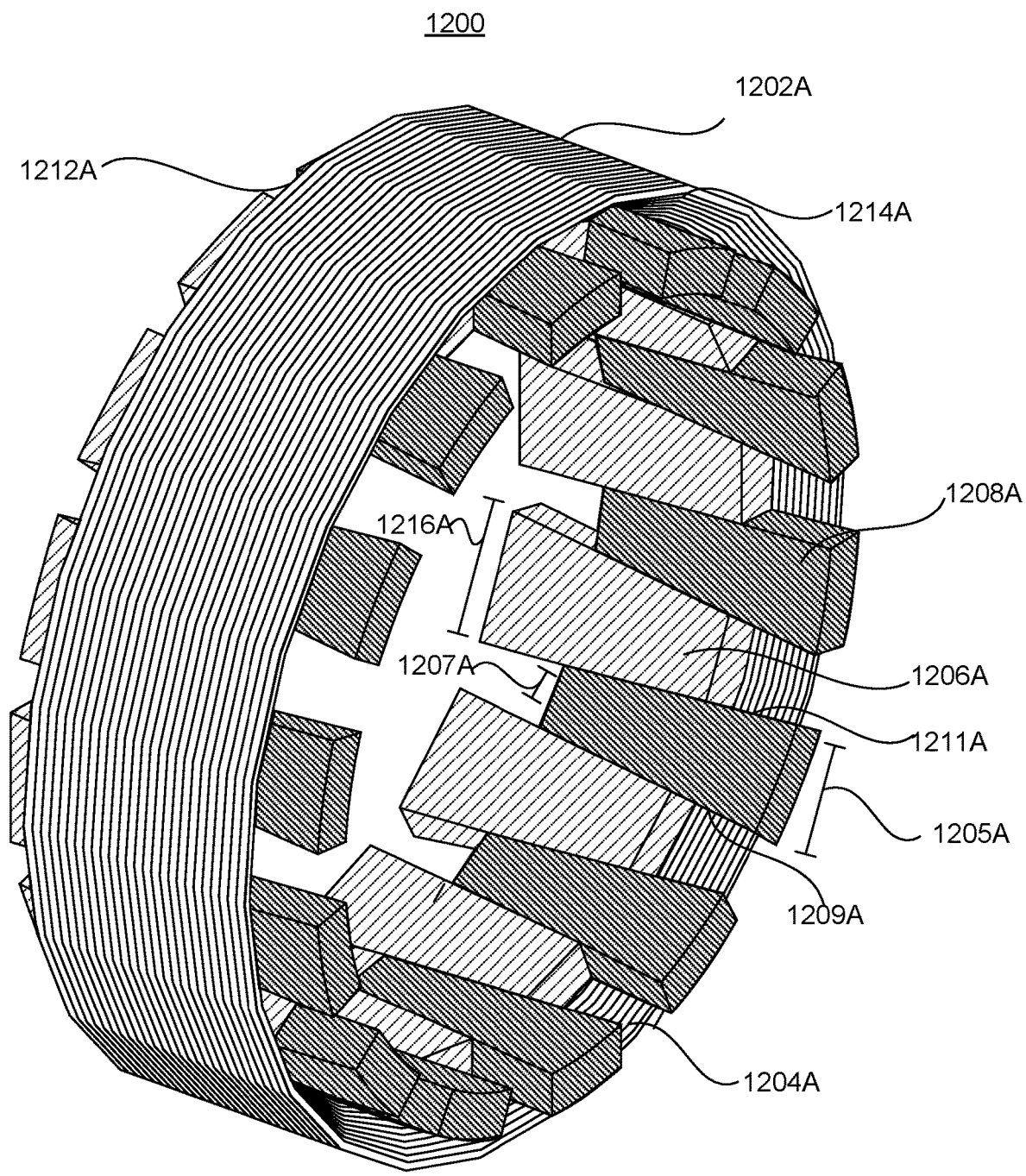
FIGS. 12A-12B are illustrations of isometric views of a rotor assembly, consistent with disclosed embodiments.
Figure 12B:
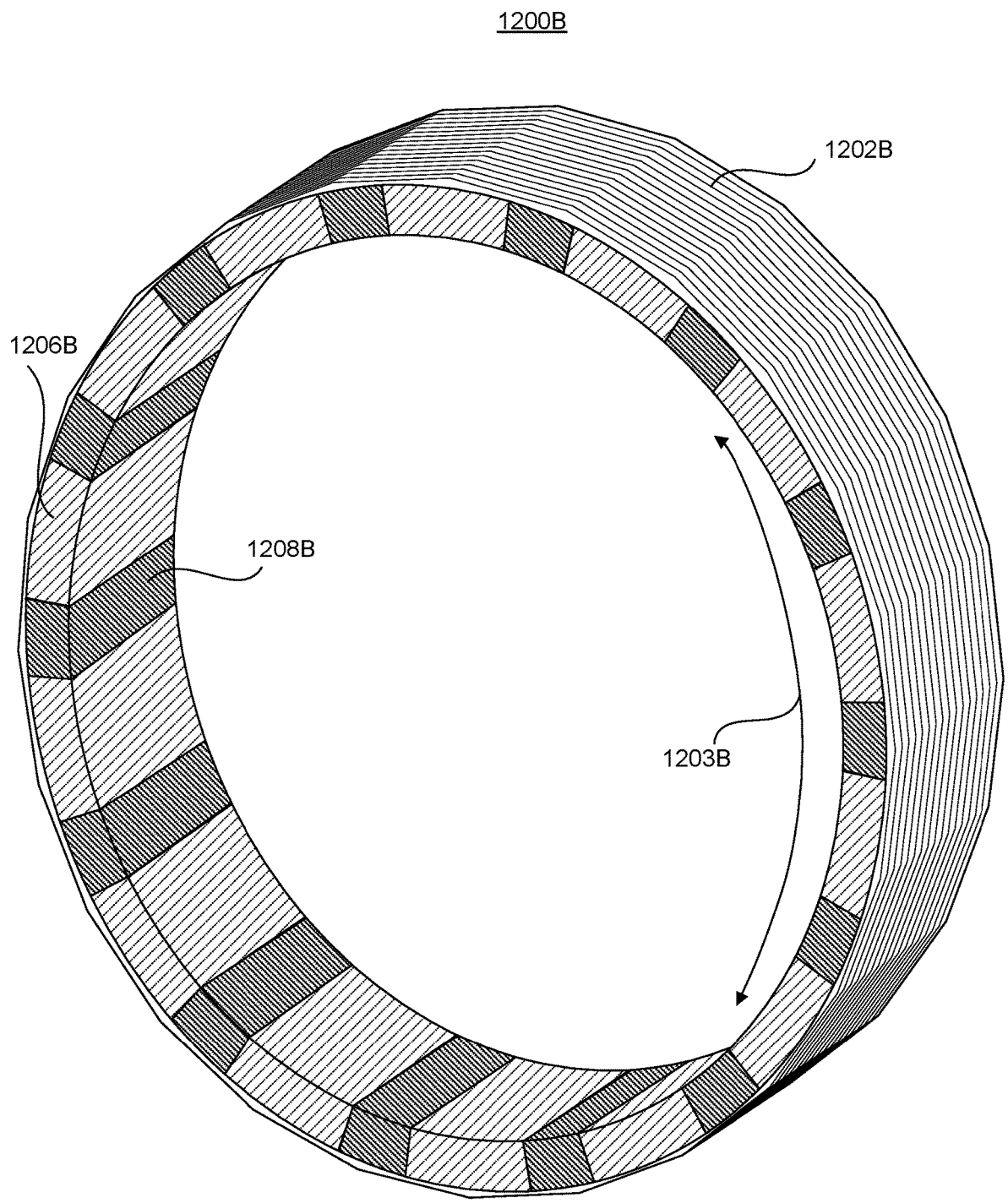

FIG. 12A-12B illustrate isometric views of a rotor assembly, consistent with embodiments of the present disclosure. In some embodiments, the plurality of magnets may abut one another along an inner diameter of the sleeve. For example, rotor assembly 1200A includes a first set of tapered magnets 1206A and a second set of tapered magnets 1208A. The width of the tapered magnets may decrease from one side to another. For example, the width at first side 1205A may be greater than the width at second side 1207A. First side 1205A may be parallel to second side 1207A. First tapered side 1211A and second tapered side 1209A may be inclined relative to the first side 1205A and second side 1207A. In some embodiments, first tapered side 1211A and second tapered side 1209A may form a tapered magnet such that second side 1207A may be smaller in width than first side 1205A. The magnets may be positioned along an inner diameter 1204A of the sleeve 1202A. In some embodiments, the direction of taper in tapered magnets 1206A may be opposite to the direction of taper in tapered magnets 1208A. In some embodiments, the plurality of tapered magnets may be circumferentially inserted against one another. Circumferentially inserted may involve placing the magnets along the circumference of the sleeve. The magnet arrangement may be of such a size such that the arrangement, before the magnets are pushed together, fit inside the diameter of the sleeve. For example, magnets 1206B and magnets 1208B may be disposed on the inside of the sleeve 1202B such that the magnets are distributed over the circumference 1203B of the sleeve. The inclined, or tapered, sides of the first set of magnets 1206A may contact the inclined sides of the second set of magnets 1208A. In some embodiments, tapered magnets may be wedges, such that when tapered magnets in opposing orientations contact each other, the magnets may cause displacement and stretch the sleeve 1202B. For example, magnets 1206B may have an orientation opposite to magnets 1208B such that the narrow side is on the right side of magnets 1206B, and the narrow side is on the left side of magnets 1208B. For example, wider first side 1205A of magnets 1208A may be nearer to right end 1214A of sleeve 1202A. Narrower second side 1207A of magnets 1208A may be nearer to left end 1212A of sleeve 1202A. Wider first side 1216A of magnets 1206A may be nearer to left end 1212A of sleeve 1202A, and the parallel, narrow second side of magnets 1206A may be nearer to right end 1214A of sleeve 1202A.

In some embodiments, the plurality of tapered magnets may include insertion of a first set of tapered magnets axially relative to the second set of tapered magnets. For example, tapered magnets may be distributed along a circumference, and inserting the tapered magnets axially may involve pushing the magnets towards the center of the sleeve. The magnets may be wedged against each other. For example, magnets 1206A may be wedged between an adjacent pair of magnets 1206B and vice-versa. With this arrangement, as each magnet (e.g., 1206A or 1206B) is inserted in an axial direction, the magnet may cause a displacement, in a circumferential direction, of its neighboring magnet having an opposite taper, resulting in an increased diameter of the magnet arrangement as the opposing magnets push each other apart, thereby stretching sleeve 1202A and inducing tension in the sleeve. In some embodiments, the amount of strain tolerated by the sleeve may contribute to determining how much the sleeve may stretch without breaking, thus contributing to determining sizes of the sleeve (e.g. diameter) and magnets (e.g., length, width, taper angle). In some embodiments, friction between magnets 1206B and magnets 1208B may secure or lock the magnets in a fixed position. It will be appreciated that in some embodiments, circumferentially inserting the magnets using a premade sleeve may provide higher achievable cylinder stress and pressure to retain the magnets compared to direct winding.

Figures 13A, 13B:
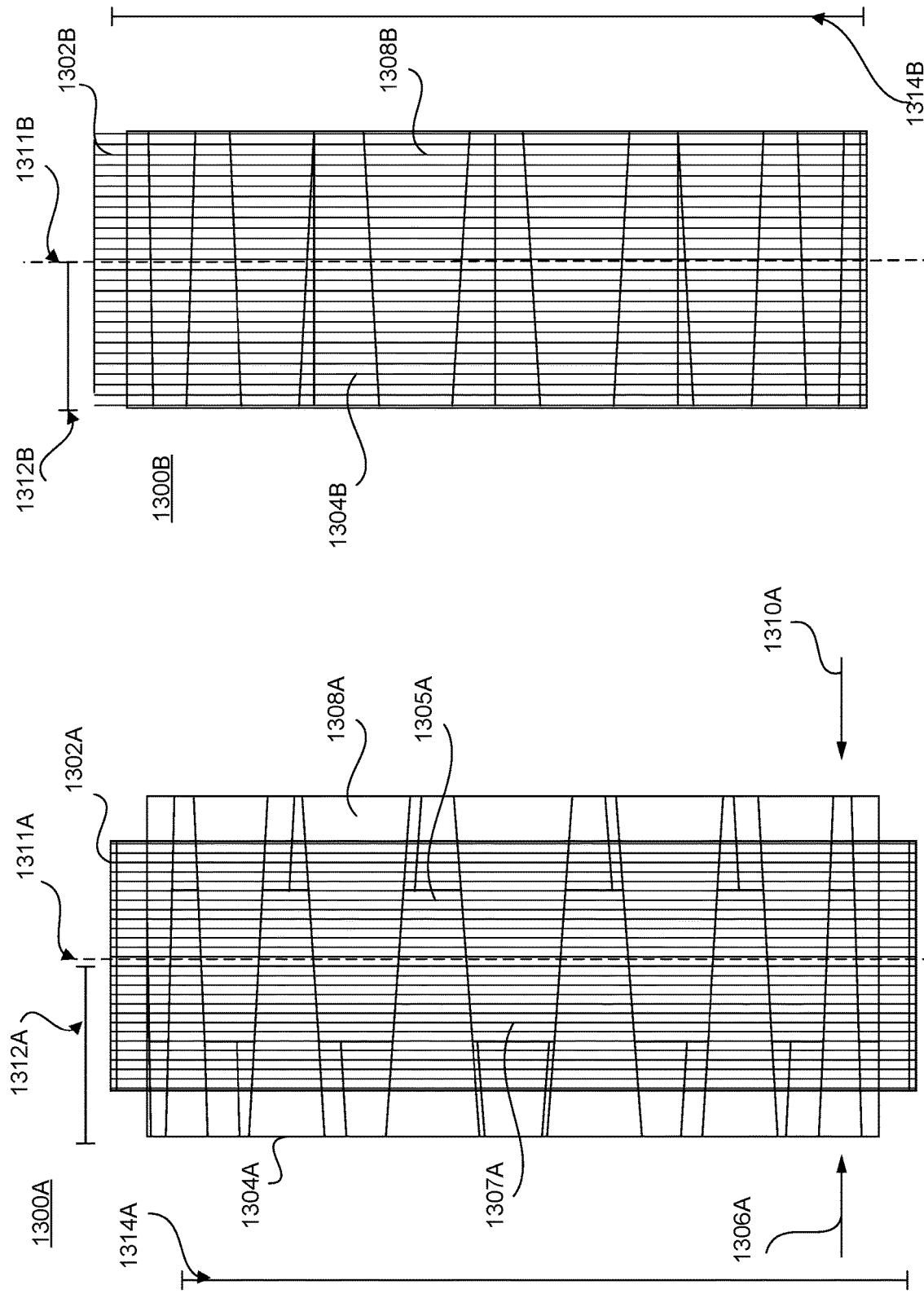
FIGS. 13A-13B are illustrations of side views of a rotor assembly, consistent with disclosed embodiments.

FIGS. 13A-13B depict side views of a rotor assembly, consistent with embodiments of the present disclosure. Rotor assembly 1300A may include first plurality of magnets 1304A with a taper in opposing orientation to a taper of second plurality of magnets 1308A, surrounded by sleeve 1302A. Disclosed embodiments may involve the second plurality of tapered magnets 1308A being positioned between adjacent pairs of the first plurality of magnets 1304A. For example, the tapered end 1305A corresponding to the first plurality of magnets 1304A may contact the tapered end 1307A corresponding to the second plurality of magnets 1308A. As discussed herein, the plurality of magnets may be inserted axially. For example, the first plurality of magnets 1304A may be pushed in a first axial direction 1306A towards second plurality of magnets 1308A pushed in a second axial direction 1310A. First axial direction 1306A may be axially relative to second axial direction 1310A by being opposing to second axial direction 1310A along the same axis. The magnets may be placed at a certain axial length, which may be a distance from a central axis on the rotor assembly. For example, the wide end of magnets 1304A may be placed at an distance 1312A from the axis 1311A of the rotor assembly 1300A such that the tapered magnets abut one another. In this condition, the sleeve 1302A may have an unstretched diameter 1314A. As the tapered magnets are pushed towards each other, the axial distance 1312A may reduce. It will be recognized that as the tapered magnets are pushed towards each other, the wedge-shaped magnets may displace each other in a circumferential direction, thereby increasing the diameter of the sleeve 1302A such that the stretched diameter 1314B of sleeve 1302A is greater than unstretched diameter 1314A. For example, magnets 1304B and magnets 1308B may be inserted such that their wide ends are at a reduced axial distance 1312B from central axis 1311B. As a result, sleeve 1302B may be expanded in diameter and stretched, such that the sleeve 1302B attains stretched diameter 1314B, consequently generating preload in the sleeve. Stretched diameter 1314B may be an increase in diameter from unstretched diameter 1314A. In some embodiments, rotor assembly 1300B may represent the position of the magnets during operation or in an operational configuration. It will be recognized that such configurations of rotor assemblies may have improvements over direct wound carbon fiber rotor assemblies. For example, such configurations may provide advantages including enabling the generation of more pressure or tension compared to direct wound rotor assemblies. Direct wound rotor assemblies may also involve curing processes, and component variation during curing may lead to losses in preload from the winding. Additionally, direct wound rotor assemblies may involve curing processes which may occur at high temperatures, which may be detrimental to permanent magnets and may induce demagnetization.

Figure 14A:
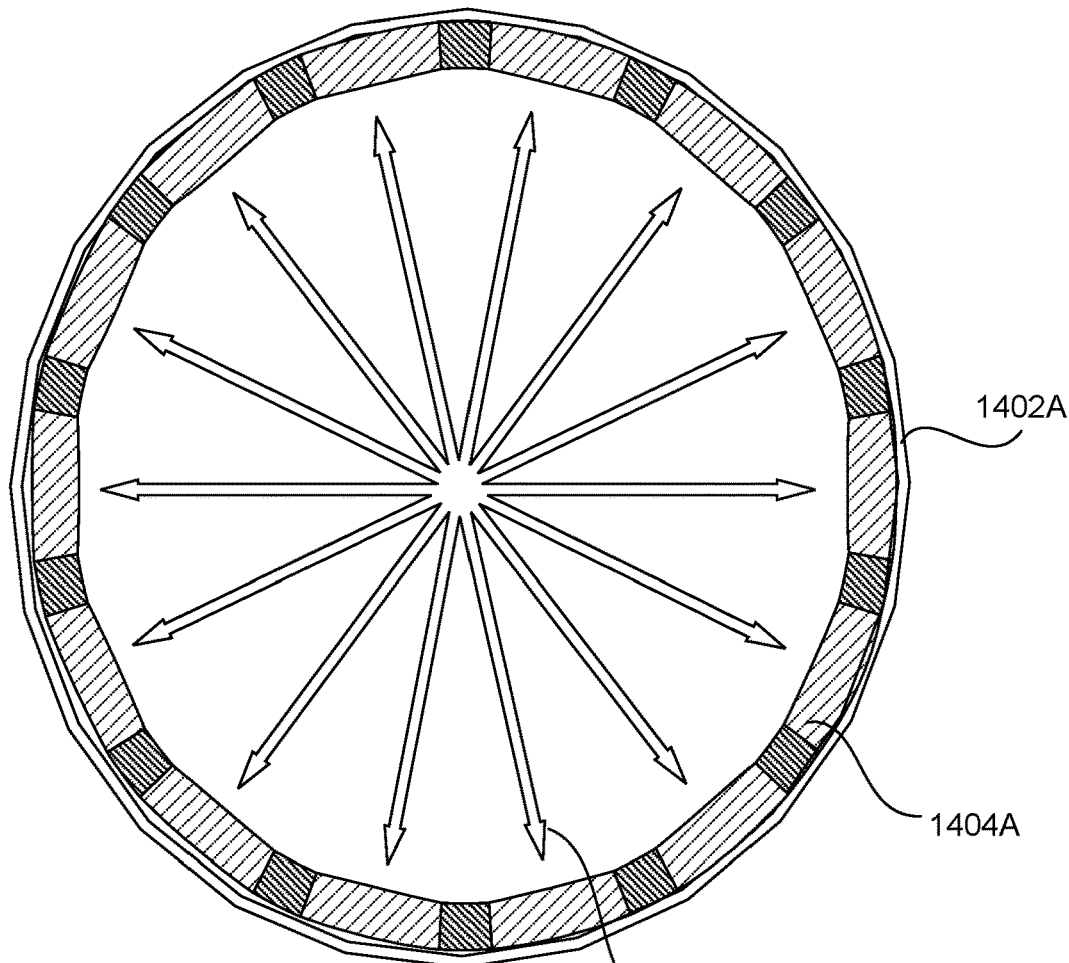
FIG. 14A is an illustration of a front view of a rotor assembly, consistent with disclosed embodiments.

FIG. 14A illustrates a front view of a rotor assembly, consistent with embodiments of the present disclosure. Rotor assembly 1400A may include sleeve 1402A and magnet arrangement 1404A. In some embodiments, circumferentially inserting the tapered magnets may expand sleeve 1402A, as described herein. For example, circumferentially inserting the magnets may expand the sleeve 1402A in a direction 1406A such that the circumference of the sleeve 1402A expands.

Figure 14B:
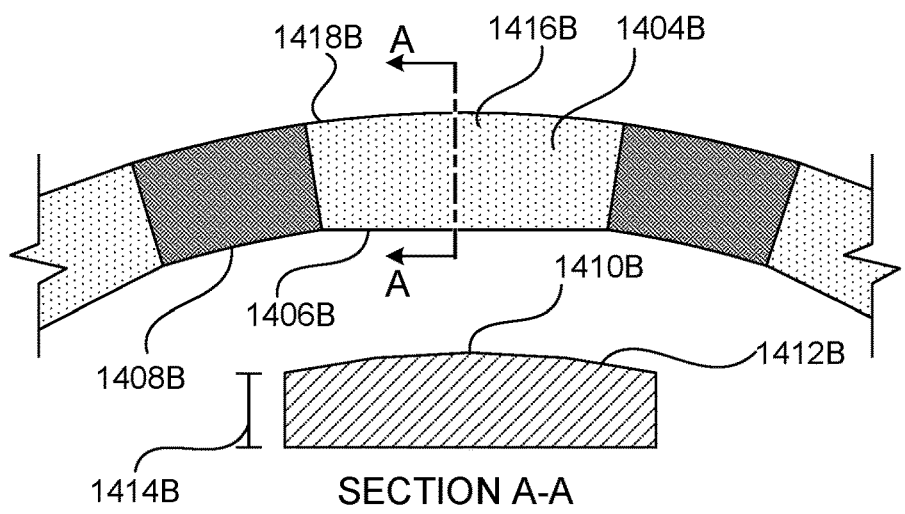
FIG. 14B is an illustration of a partial front cross-sectional view of a magnet assembly, consistent with disclosed embodiments.

In some embodiments, the plurality of tapered magnets includes a crown. A crown may include a raised surface on the magnets. For example, a crown may include a raised surface on a top side of the magnets. In some embodiments, the crown abuts on the inner diameter of the sleeve. FIG. 14B illustrates a partial front cross-sectional view of the magnet assembly, consistent with embodiments of the present disclosure. Magnet 1404B may include crown 1410B on an outer circumferential face 1412B of magnet 1404B. Crown 1410B may include a raised surface such that a thickness 1414B (e.g., in a radial direction) of magnet 1404B may be greater at the center 1416B than at edges 1418B. The crown 1404B may abut on the inner diameter of sleeve 1402A. The interaction between the crown 1410B and sleeve 1402A may provide a locking feature which may secure the magnets to the sleeve. For example, due to the increased height in the center of the magnet at crown 1410B, the sleeve 1402A may be stretched more in the center and have higher tension in the center. Thus, the increased tension and friction may provide retention and may prevent the sleeve 1402A from shifting. In some embodiments, crown 1410B may contribute towards satisfying regulatory requirements by providing retention that may be additional to friction retention of the sleeve.

In some embodiments, a rotor assembly may include a lamination core. Lamination cores may include a core of an electric motor. In some embodiments, lamination cores may be comprised of metals such as steel or iron. Lamination cores may assist in moving magnetic flux between different poles on the stator or rotor. As discussed herein, lamination cores may refer to a back iron, steel core, or steel laminations, or lamination stack. For example, rotor assembly 1100 includes lamination core 1108, as referenced in FIG. 11. As discussed herein, magnets in the rotor assembly may contact or be adjacent to the lamination core. In some embodiments, magnets may have curved faces or flat faces which may contact the lamination core. For example, the plurality of tapered magnets 1404B may include magnets with flat side 1406B and magnets with curved side 1408B. The flat side 1406B and curved side 1408B may be an inner diameter of the magnets which contact the outer diameter of the lamination core. Magnets with curved side 1408B may include a curve, arch, or arc on the face of the magnet which abuts on the lamination core. Magnets with flat side 1406B may assist in transmitting torque from the magnets to the lamination core. For example, the rotation of the magnets and the preload generated by the sleeve may generate torque, and the torque may be transferred from the flat side of the magnets to the lamination core, thereby coupling the magnets and the lamination core such that the rotation of the magnets induces rotation of the lamination core. In some embodiments, magnets may include suitable shapes such as one or more flat surfaces, flat edges, or flat faces, one or more curved faces, or any combination or flat and curved faces.

Figure 15:
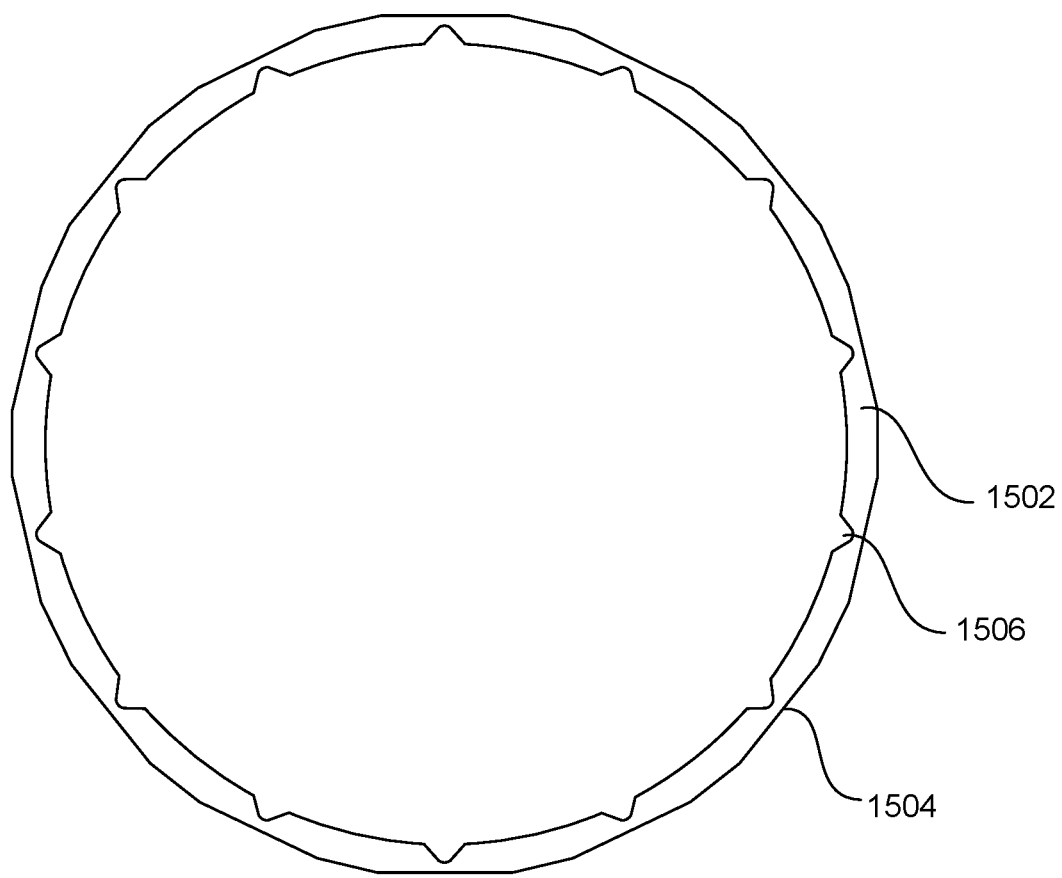
FIG. 15 is an illustration of a top view of a lamination core, consistent with disclosed embodiments.

FIG. 15 illustrates a top view of a lamination core, consistent with embodiments of the present disclosure. Disclosed embodiments may include flat sections 1504 on the outer diameter of lamination core 1502. Flat sections 1504 may correspond to the magnets or the number of poles in the rotor assembly. For example, there may be a number of flat sections corresponding to the number of tapered magnets disposed on the circumference of the rotor assembly. In some embodiments, the lamination core may include at least one notch. A notch may include a region of removed material such as an indent, cut, or incision. For example, lamination core 1502 includes triangular notch 1506 under flat section 1504. In some embodiments, there may be reduced magnetic flux in the region of the notch. As such, the metal may not be required in that region, and removing the metal may result in mass savings. Additionally, notches and cutouts may provide torque transmission features from the lamination of the rotor to the rotor hub. In some embodiments, torque from the magnets may be transmitted to the lamination core as flat magnets 1406B interface with the outer diameter of lamination core 1502, such as contacting flat sections 1504. Such configuration of the flat side of the magnets abutting on the flat side of the lamination core may transmit torque. In some embodiments, an outer diameter of the lamination core abuts on at least some of the plurality of magnets. For example, outer diameter of lamination core 1502 may abut on some of the plurality of magnets 1102 or 1103, as referenced in FIG. 11. At least some of the plurality of the magnets may include one or more of the magnets or certain portions of the magnets. For example, lamination core 1502 may abut on flat sides of the magnets, as described herein. In some embodiments, lamination core 1502 may abut on all of the magnets, such that the lamination core abuts on each magnet in the plurality of magnet or the lamination core contacts the majority of the surface of each magnet in the plurality of magnets. In some embodiments, a lamination core may comprise no notches. In some embodiments, a lamination core may suitable shapes such as one or more flat sides, a fully-curved shape, rounded shapes, or any combination therein.

In some embodiments, a rotor assembly may include a rotor hub. A hub may include a disk, covering, or central component. A hub may connect one or more components in the rotor assembly. For example, the hub may connect a bearing to the rotor. In some embodiments, a rotor hub may retain at least one of the lamination core, the plurality of tapered magnets, or the sleeve. Retaining may involve preventing separation or movement, including restraining, embracing, holding, securing, fastening, and/or fixing. The hub may be comprised of metals, including aluminum. In some embodiments, a rotor assembly may involve one or more rotor hubs.

Figure 16:
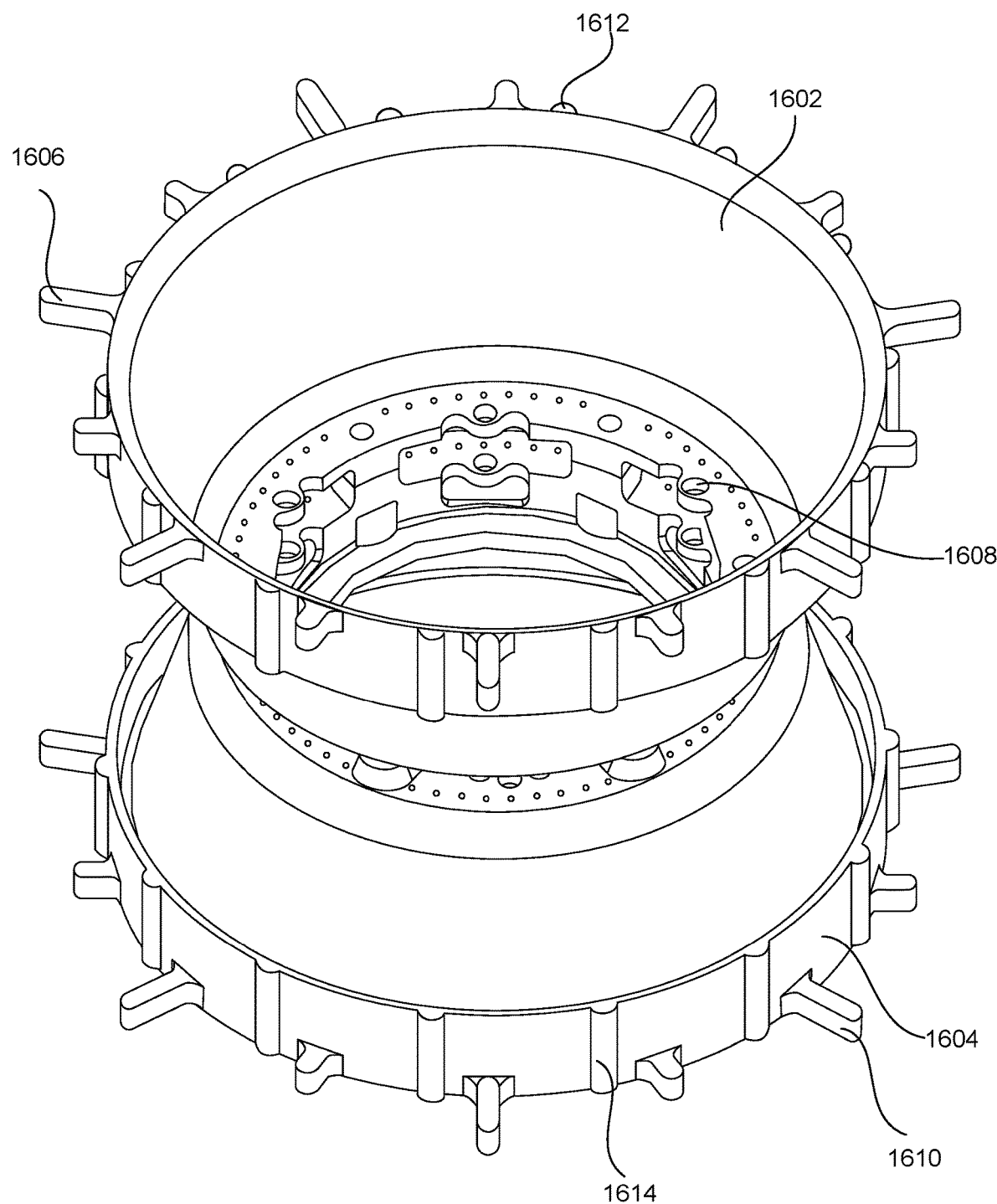
FIG. 16 is an illustration of rotor hubs, consistent with disclosed embodiments.

FIG. 16 illustrates an exemplary embodiment illustrating a pair of rotor hubs, consistent with embodiments of the present disclosure. For example, a rotor assembly may include a first rotor hub 1602 and a second rotor hub 1604. The first rotor hub 1602 may abut a first side of a lamination core, and the second rotor hub 1604 may abut a second side of a lamination core. In some embodiments, a rotor assembly including two rotor hubs may present advantages including symmetry, improved thermal expansion, and improved dimensional consistency which may improve manufacturability and assembly. Disclosed embodiments of rotor assemblies may enable lower radial engagement, or contact, between the hub and the lamination core. For example, embodiments including two rotor hubs may reduce contact between the rotor hubs and the inner diameter of the steel core, thereby enabling the reduction of unnecessary material and reducing mass. In some embodiments, placing conductive metal, such as aluminum, adjacent to electromagnetic fields such as those in the laminations may result in shorts or eddy current losses, which may create heat and reduce efficiency. Disclosed embodiments may minimize the interaction between the rotor hubs and the laminations, thereby reducing eddy losses and improving efficiency. Rotor hubs may include holes 1608, which may allow for fastening or connecting, including by dowel pins, rods, or screws, the rotor hub to other components. As discussed herein, attaching components, including fastening or connecting, may involve any suitable means of attachment, such as dowel pins, rods, screws, bolts, or rivets. First rotor hub 1602 and second rotor hub 1604 may include protrusions 1606, 1610. Protrusions 1606, 1610 may assist in retaining components of the rotor assembly. For example, protrusions 1110 on rotor hub 1106 may retain the lamination core 1108, magnets 1102,1103, and sleeve 1104, as referenced in FIG. 11. The protrusions 1110 may extend from the rotor hub 1106 to capture or mechanically engage the lamination core 1108, magnets 1102,1103, and sleeve 1104, such that they are prevented from displacing, such as shifting axially, during operation. In some embodiments, displacement, such as displacement of the magnets, may be detrimental to operation of the electrical propulsion system, as displacement may fatigue the sleeve or require rebalancing of the rotor. Protrusions 1110 may present additional engagement and retaining of components in the rotor assembly which may further deter components from separating or shifting away from the rotor, which may provide advantages over reliance on friction alone to deter separation or shifting.

In some embodiments, rotor hubs may include torque transmission features. For example, first rotor hub 1602 and second rotor hub 1604 may include one or more projections such as projections 1612, 1614. Projections 1612,1614 may be pins or raised surfaces on the outer diameter of first rotor hub 1602 and second rotor hub 1604. Projections 1612,1614 may assist in transmitting torque to the rotor hubs. For example, projections 1612,1614 may interface with notches 1506 on lamination core 1502. The projections 1612, 1614 may align with the cutout of notches 1506 such that the projections abut on the cutout. Thus, the lamination 1502 may be coupled to the first rotor hub 1602 and second rotor hub 1604 such that the rotation of the lamination core 1502 may induce rotation in the rotor hubs due to the contact of the notches 1506 with the projections 1612,1614. For example, the torque from the tapered magnets 1102 may transmit to the lamination core 1108, as referenced in FIG. 11. The contact at the interface 1112 between projections of the rotor hub 1106 and notches of the lamination core 1108 may assist in transmitting torque from the lamination core 1108 to the rotor hub 1106.

FIGS. 17A-17D illustrate cross-sectional views of a rotor assembly, consistent with embodiments of the present disclosure. Rotor assembly 1700A may include first rotor hub 1702A and second rotor hub 1704A, which may both enclose and retain lamination core 1706A, 1709A. For example, first rotor hub 1702A may enclose lamination core 1709A at first interface 1711A, and second rotor hub 1704A may enclose lamination core 1709A at second interface 1713A. Disclosed embodiments may include a gap, space, or separation 1708B between first rotor hub 1702A and second rotor hub 1704A. It will be appreciated that rotor hubs engaging the magnets and lamination core 1706A from two sides may provide better mechanical axial retention in comparison to retention from one side. In some embodiments, rotor hubs may provide a radial connection between a bearing and the lamination core. For example, rotor hub 1702A may have a first interface 1708A with the lamination core 1709A, and rotor hub 1704A may have a second interface 1710A with lamination core 1709A, and the interfaces may allow torque transfer from the lamination core to the rotor hubs to the bearing or to the input gear. In some embodiments, rotor hubs may have a separation or gap, such as separation distance 1708B between first rotor hub 1702B and second rotor hub 1704B, which may allow for the flow of fluids such as coolants. In some embodiments, rotor hubs may assist in reacting gyroscopic loads. For example, increasing the separation distance 1708B between the first rotor hub 1702B and second rotor hub 1704B may result in an increased area moment of inertia. Disclosed embodiments of multiple rotor hubs may allow for easier adjustment of the rotor assembly, such as easier adjustment of the area moment of inertia on the connection to an input gear while maintaining mass savings. For example, increasing separation distance 1708B may result in a stronger rotor.

Figure 17A:
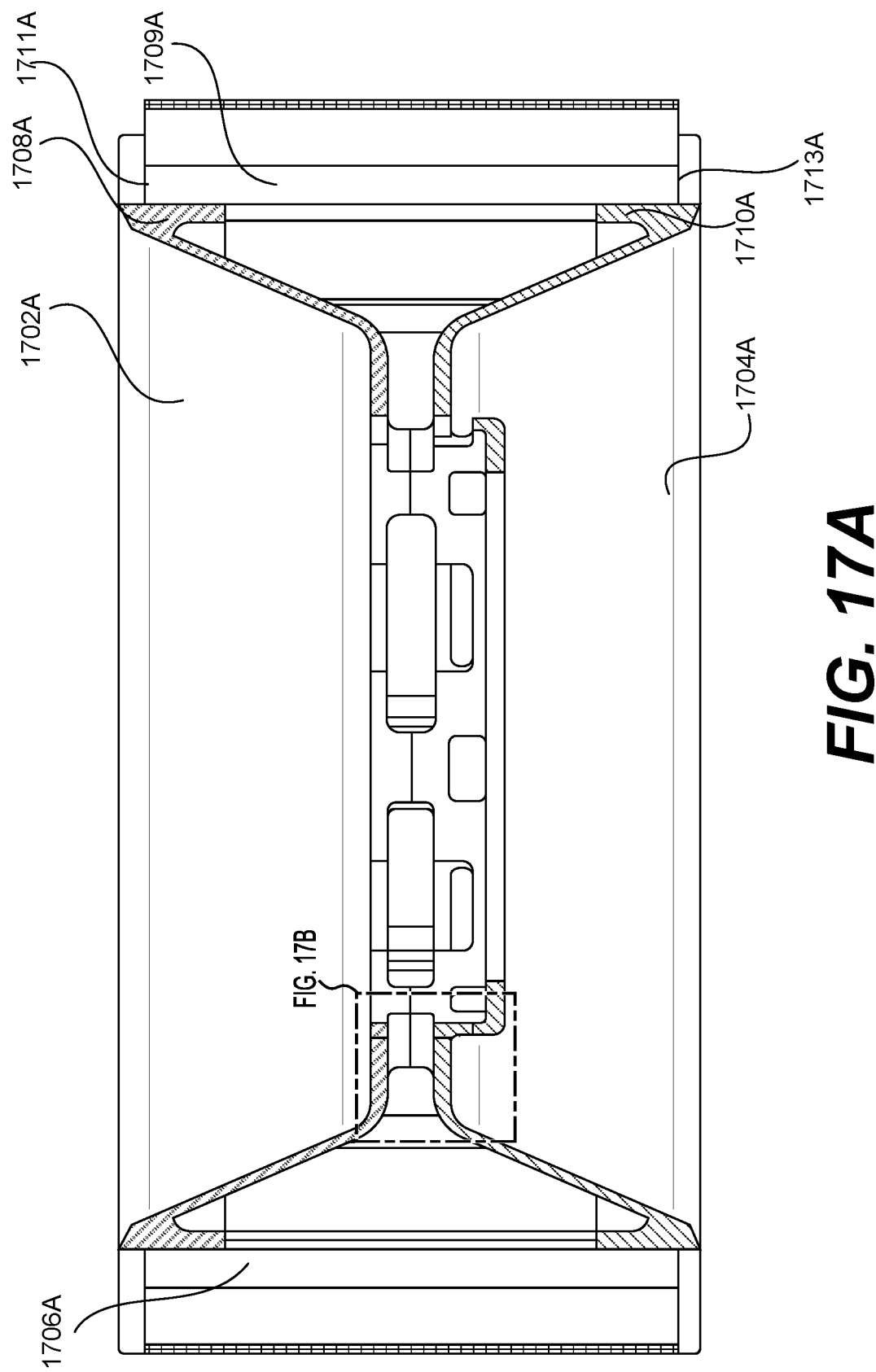
FIGS. 17A-17D are illustrations of cross-sectional views of a rotor assembly, consistent with disclosed embodiments.
Figure 17B:
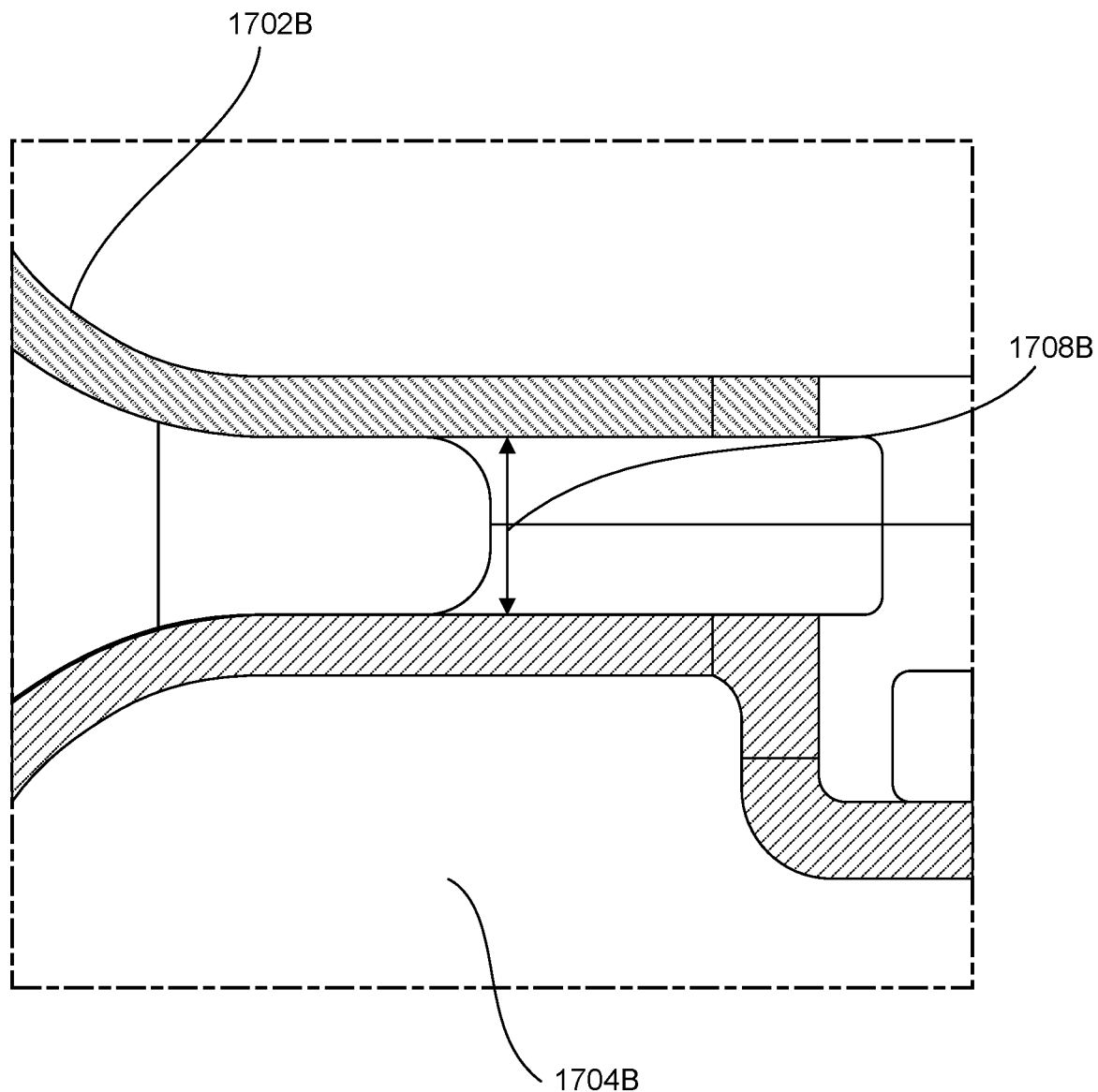
Figure 17C:
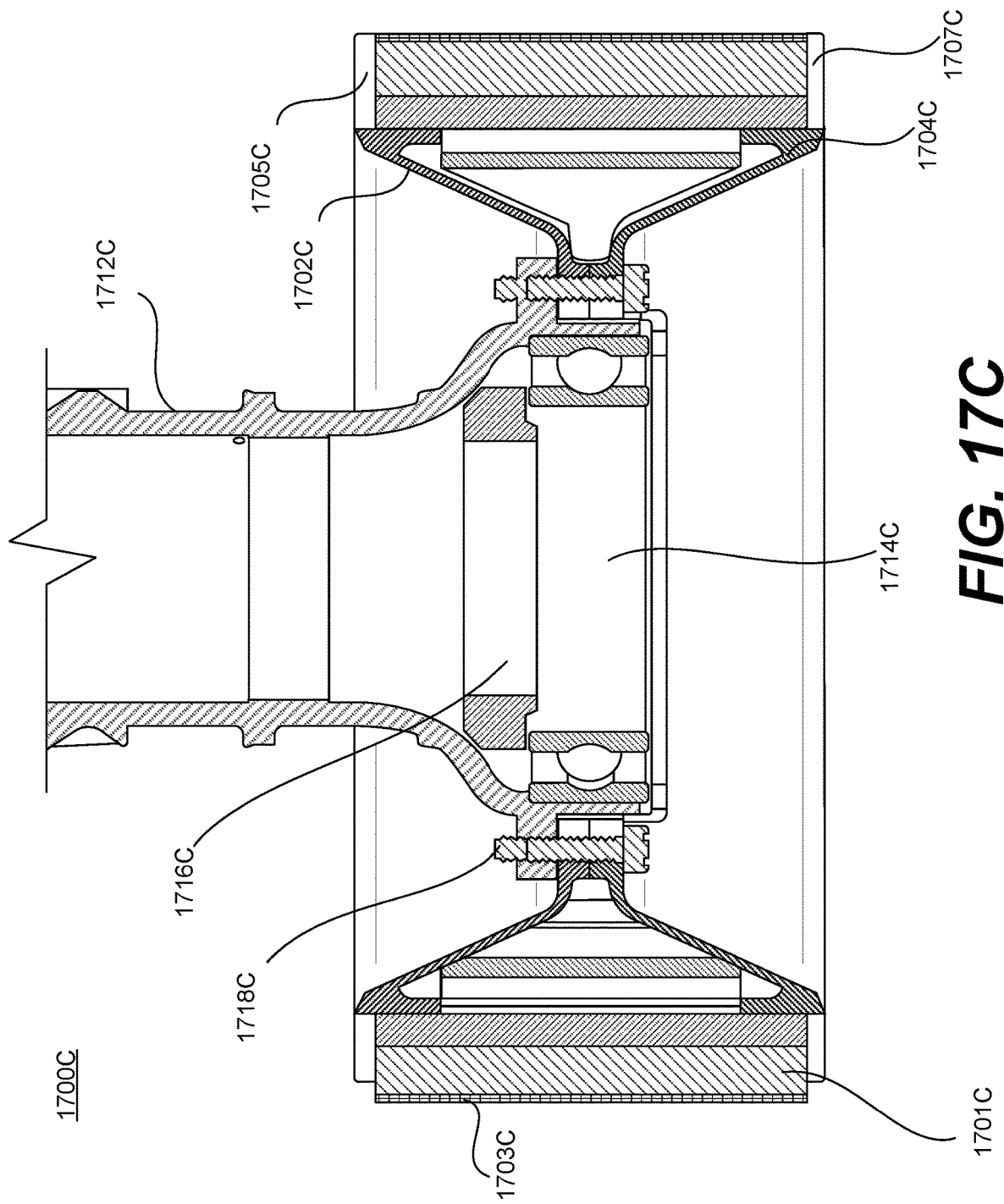

FIG. 17C illustrates a cross-sectional view of a rotor assembly, consistent with embodiments of the present disclosure. Rotor assembly 1700C may include first rotor hub 1702C and second rotor hub 1704C. Bearing 1714C and buttress 1716C may be substantially integrated into sun gear 1712C. Substantially integrated may involve bearing 1714C and buttress 1716C being surrounded by sun gear 1712C or being housed within sun gear 1712C. Such configuration of bearing 1714C within the sun gear 1712C may present advantages including preventing the bearing 1714C from having to react loads such as loads due to tension in the sleeve 1703C or pressure, because such pressure or loads may cause the bearing bore to reduce in size. Rather, disclosed embodiments may involve the magnets 1701C reacting loads, as discussed herein As such, disclosed embodiments may prevent deformation or size reduction of the bearing bore, thereby ensuring consistent component fit during assembly. Magnets 1701C may be retained on opposing ends or peripheries of the rotor assembly 1700C. For example, first rotor hub 1702C may retain the magnets on a first side 1705C of the rotor assembly 1700C, and second rotor hub 1704C may retain the magnets on a second side 1707C of the rotor assembly 1700C, thereby providing improved retention to the magnets. In some embodiments, bolts 1718C may extend through holes in second rotor hub 1704C, first rotor hub 1702C, and sun gear 1712C, thereby attaching and connecting the components. For example, bolts 1718C may mechanically couple first rotor hub 1702C and second rotor hub 1704C to sun gear 1712C such that movement or rotation of the rotor, and therefore rotation of the rotor hubs, results in rotation of the sun gear. In some embodiments, the sun gear may be an input gear such that the rotation of the sun gear drives an input to a gearbox, including a planetary gearbox. For example, a torque path may be from the rotor, to the sun gear 1712C, to planetary gears, to a main shaft, which may be attached to a propeller. As described herein, interfaces between the magnets, the lamination core, and the rotor hubs may assist in transmitting torque from the magnets to the sun gear.

Figure 17D:
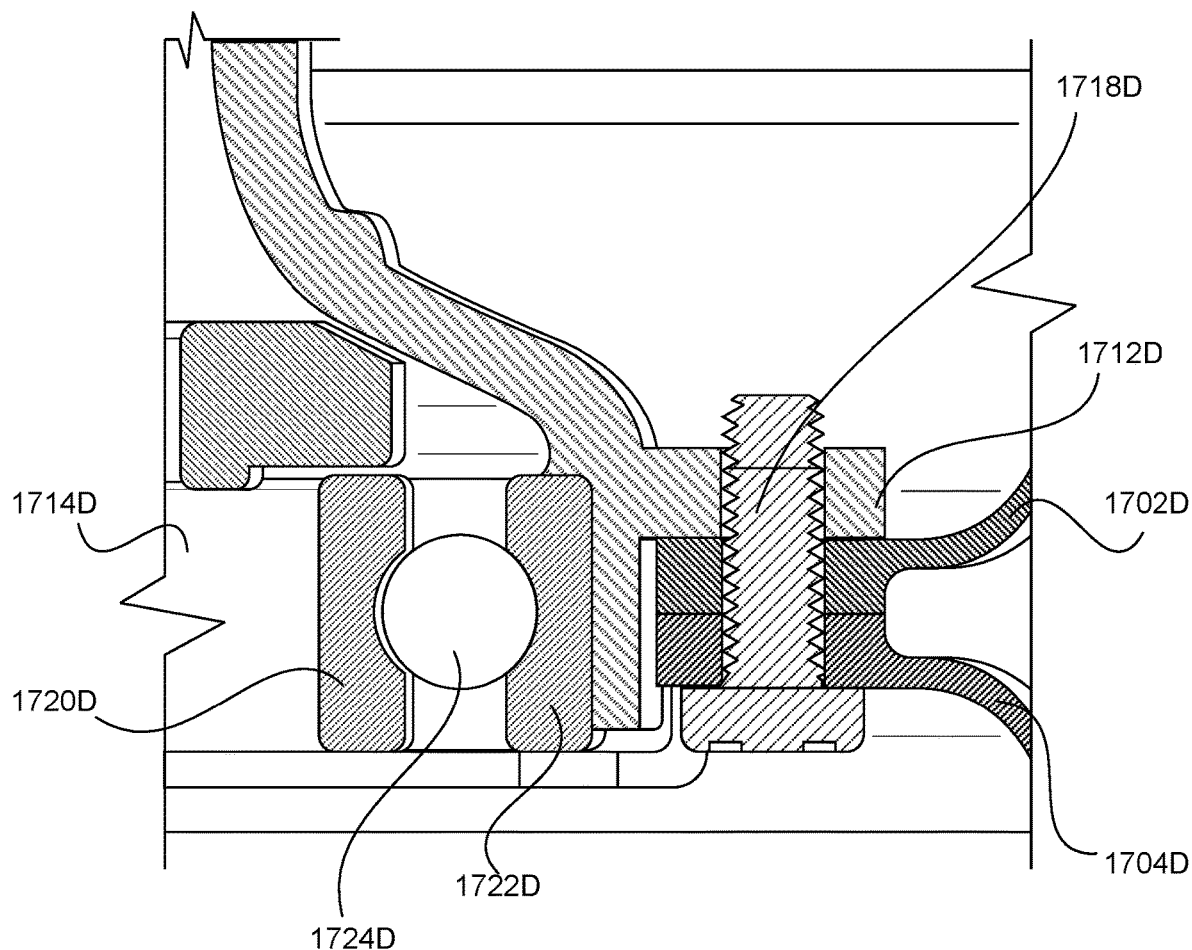

FIG. 17D illustrates a magnified partial cross-sectional view of a rotor assembly, consistent with embodiments of the present disclosure. Rotor assembly 1700D may include bearing 1714D housed within sun gear 1712D, which may prevent the deformation of the bearing bore due to load reacting, thereby providing a consistent bore fit. Additionally housing the bearing 1714D within sun gear 1712D may reduce the use of boring operations which may involve thermal expansion mismatch during assembly. Bearing 1714D may include rolling elements 1724D between inner race 1720D and outer race 1722D. In some embodiments, first rotor hub 1702D and second rotor hub 1704D may include holes for fastening. For example, bolts 1718D may extend through second rotor hub 1704D, first rotor hub 1702D, and sun gear 1712D such that the sun gear becomes attached and coupled to the rotor hubs. Sun gear 1712D may include female bolt threads to secure bolts 1718D, which may eliminate the use of nuts.

Disclosed embodiments may involve a method of assembling a rotor assembly. Disclosed embodiments may include generating pressure in a premade sleeve, as discussed herein. Generating pressure may involve inducing preload by expanding a premade sleeve. A premade sleeve may include a sleeve, such as carbon fiber wound on a mandrel. For example, carbon fiber may be wound on an aluminum cylinder as a mold under low tension. Curing the sleeve may involve high temperatures, and then cooling and extracting the sleeve. As such, by stretching the cured composite, load may be evenly distributed in the fibers and may enable higher tension or hoop stress. Disclosed embodiments may present improvements to installation and stretching of the sleeve, such as stretching the sleeve onto the rotor. For example, a premade sleeve may be expanded by circumferentially inserting a magnet arrangement. The magnet arrangement may include a first plurality of tapered magnets 1306A and a second plurality of tapered magnets 1308A, as referenced in FIG. 12A. When the first plurality of tapered magnets 1306A and the second plurality of tapered magnets 1308A are pushed in axially against each other, while being surrounded by sleeve 1302A, the sleeve 1302A may expand due to the tapered magnets acting as wedges on each other. In some embodiments, each magnet in the first plurality of magnets may be simultaneously pushed together as well as each magnet in the second plurality of magnets. In some embodiments, a premade sleeve may enable use of a larger variety of resins or curing processes, as the premade sleeve may avoid limitations due to exposing temperature-sensitive magnets to higher curing temperatures. As such, the premade sleeve may enable lower curing times and cycle time reduction. Premade sleeves may provide more flexibility in selecting materials, such as materials that are highly characterized, which may simplify regulatory approval processes.

FIGS. 18A-18F illustrate an assembly process of a rotor assembly, consistent with embodiments of the present disclosure. Magnet arrangement assembly 1802A may include the tapered magnets 1801A inserted within expanded sleeve 1803A. Disclosed embodiments may involve inserting a lamination core. For example, lamination core 1804A may be inserted into magnet assembly arrangement 1802A such as by a press fit, thereby forming torque ring assembly 1806B, as referenced in FIG. 18B. The press fit may include compensation for tolerances on various components. In some embodiments, the lamination core 1804A may be inserted into the magnet assembly arrangement by stretching the sleeve. As discussed herein, pushing the tapered magnets against each other may stretch the sleeve and increase the diameter of the sleeve. In some embodiments, during assembly, the magnets may be pushed against each other further than the distance they are pushed against each other during operation, such that the sleeve is stretched to a diameter greater than the stretched diameter during operation. For example, referring to FIG. 13B, during assembly, magnets 1304B may be pushed against magnets 1308B such that the magnets are at an axial length smaller than axial length 1312B. As a result, the amount of contact on the taper of the magnet increases as the magnets are pushed against each other further, thereby increasing the amount of expansion in the sleeve such that the sleeve has a diameter greater than stretched diameter 1314B. The lamination core 1804A may then be inserted into the magnet assembly arrangement 1802A having the expanded diameter. Once inserted, the magnets may be pushed to the amount of axial displacement during operation. Thus, as the amount of contact on the taper of the magnets decreases, the amount of stretch and therefore the diameter of the sleeve may decrease. As a result, the sleeve and the magnet arrangement apply tension to the lamination core and may thus be secured or coupled to the lamination core.

In some embodiments, outer diameter 1805A of lamination core 1804A may abut on the inner diameter 1807A of the magnet assembly arrangement 1802A. Disclosed embodiments may involve attaching at least one rotor hub to the lamination core. For example, referring to FIG. 18B, first rotor hub 1808B may be attached to a first side 1807B of torque ring assembly 1806B, and second rotor hub 1810B may be attached to a second side 1809B of torque ring assembly 1806B, thereby forming rotor assembly 1812C as referenced in FIG. 18C. Attaching may include a thermal fit, such as shrinking the aluminum hubs using liquid nitrogen. For example, the hubs may be aligned with or placed into the steel core, heated to expand and become attached to the steel core, and cooled to operational temperature. Disclosed embodiments may involve balancing the rotor assembly. In some embodiments, the rotor may be imbalanced, such as an imbalance of mass or inconsistent weight distribution. It will be recognized that unbalanced rotors may reduce lifespan of the rotor, reduce efficiency, and increase vibrations. In some embodiments rotor assembly 1812C may be balanced by machining material away or machining added material away to compensate for imbalance. For example, material such as rivets may be added to the rotor in places where additional mass is needed for even weight distribution, or material may be subtracted from the rotor.

Figure 18A:
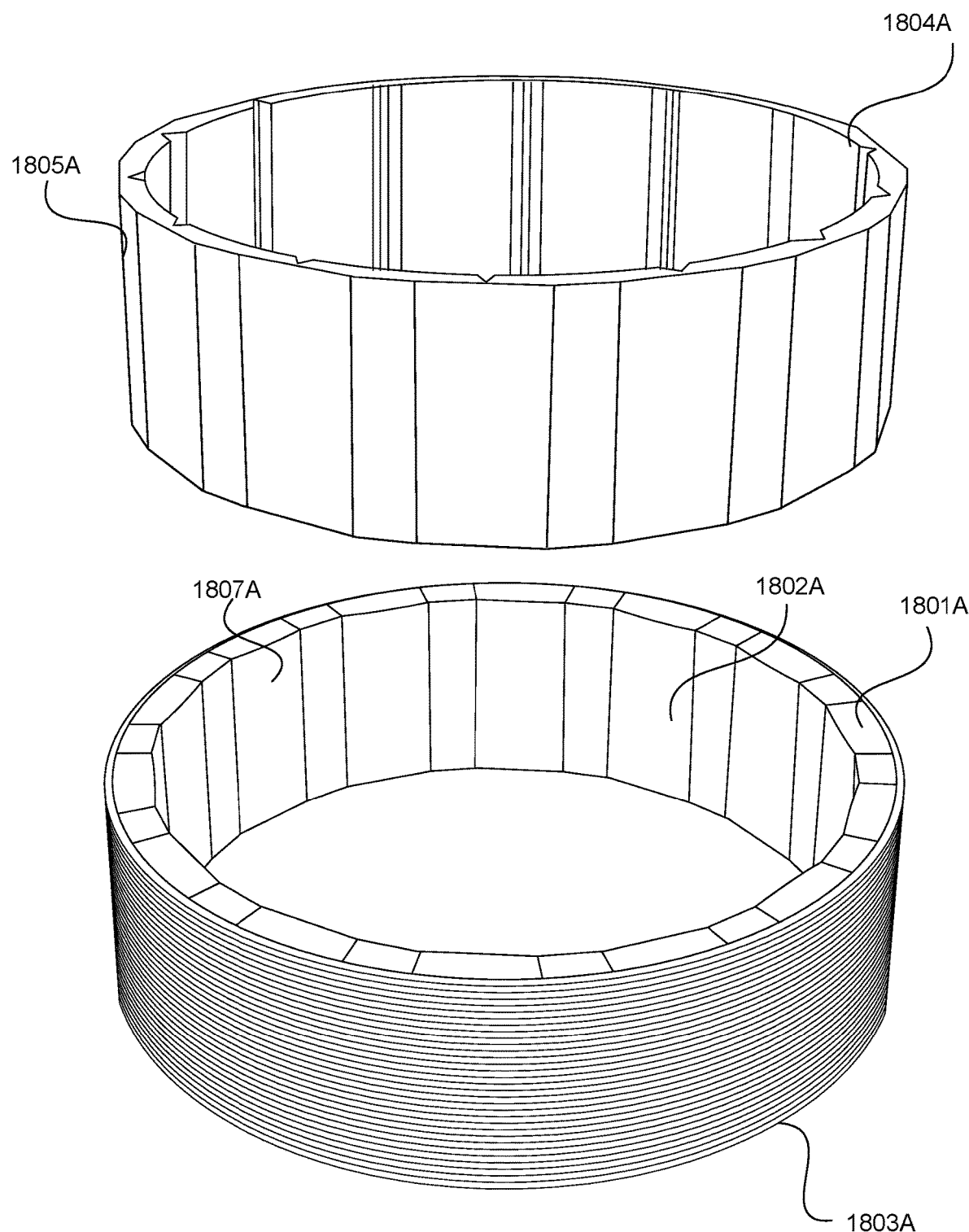
FIGS. 18A-18F are illustrations of an assembly process of a rotor assembly, consistent with disclosed embodiments.
Figure 18B:
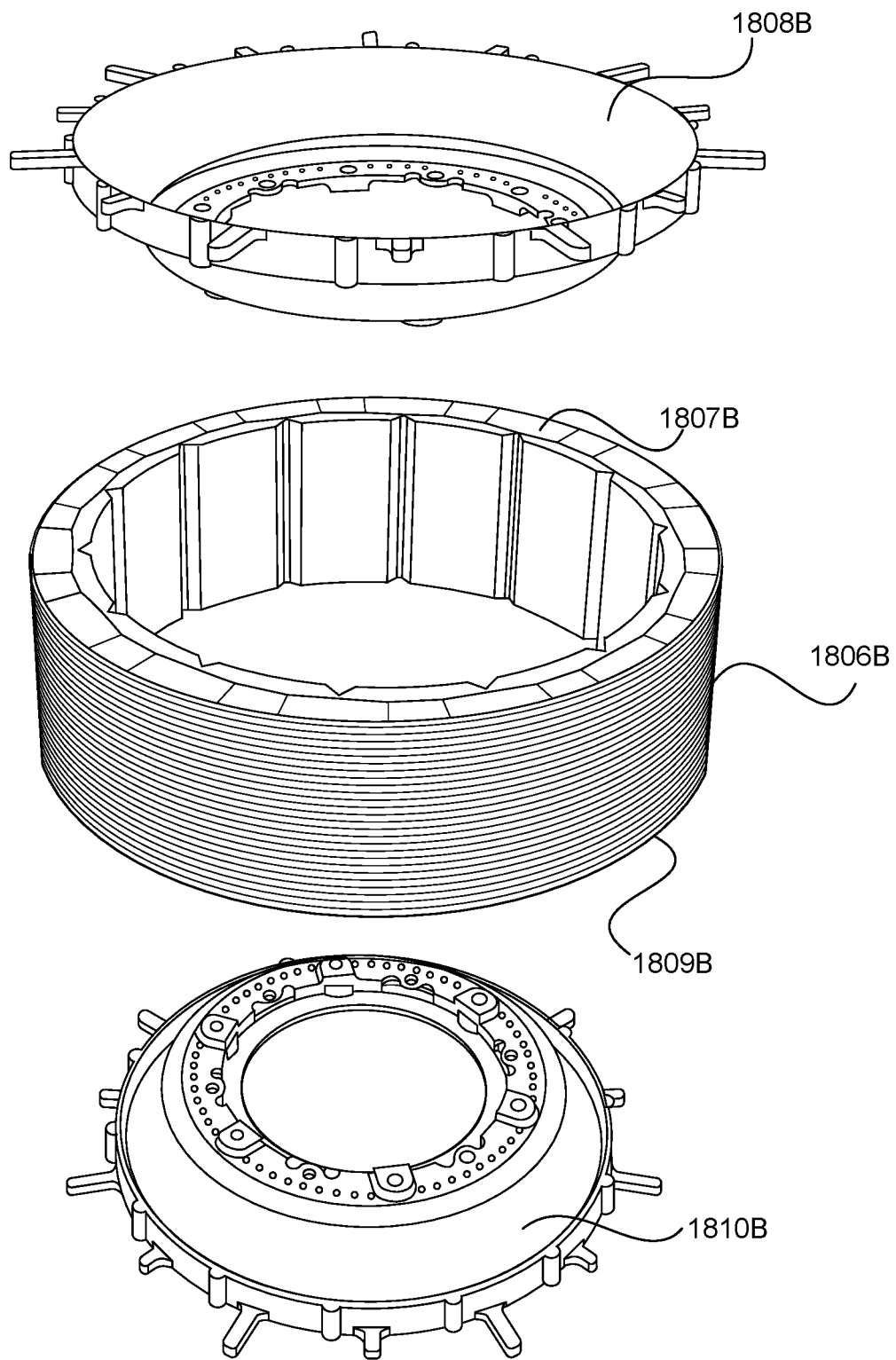
Figure 18C:
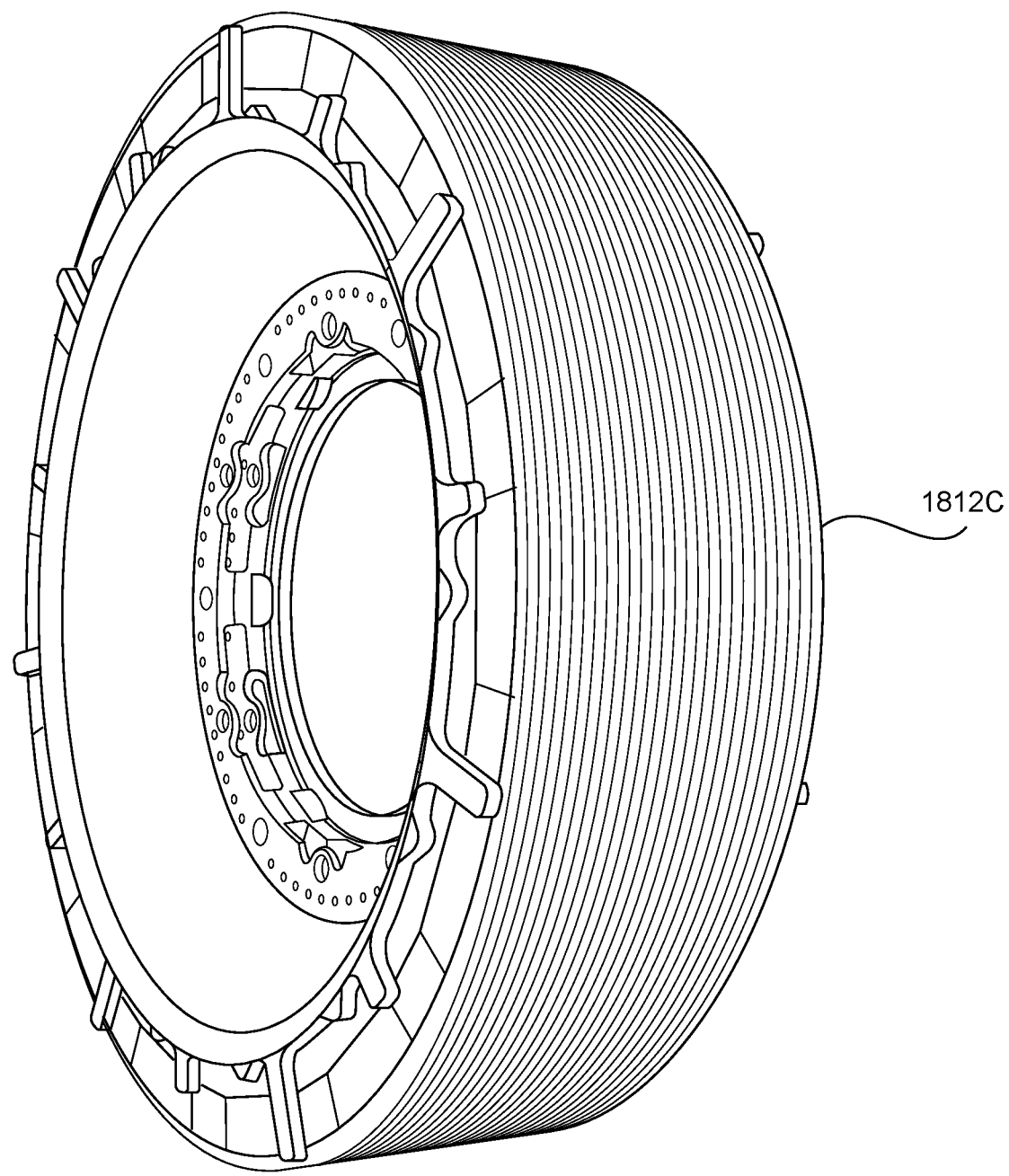
Figure 18D:
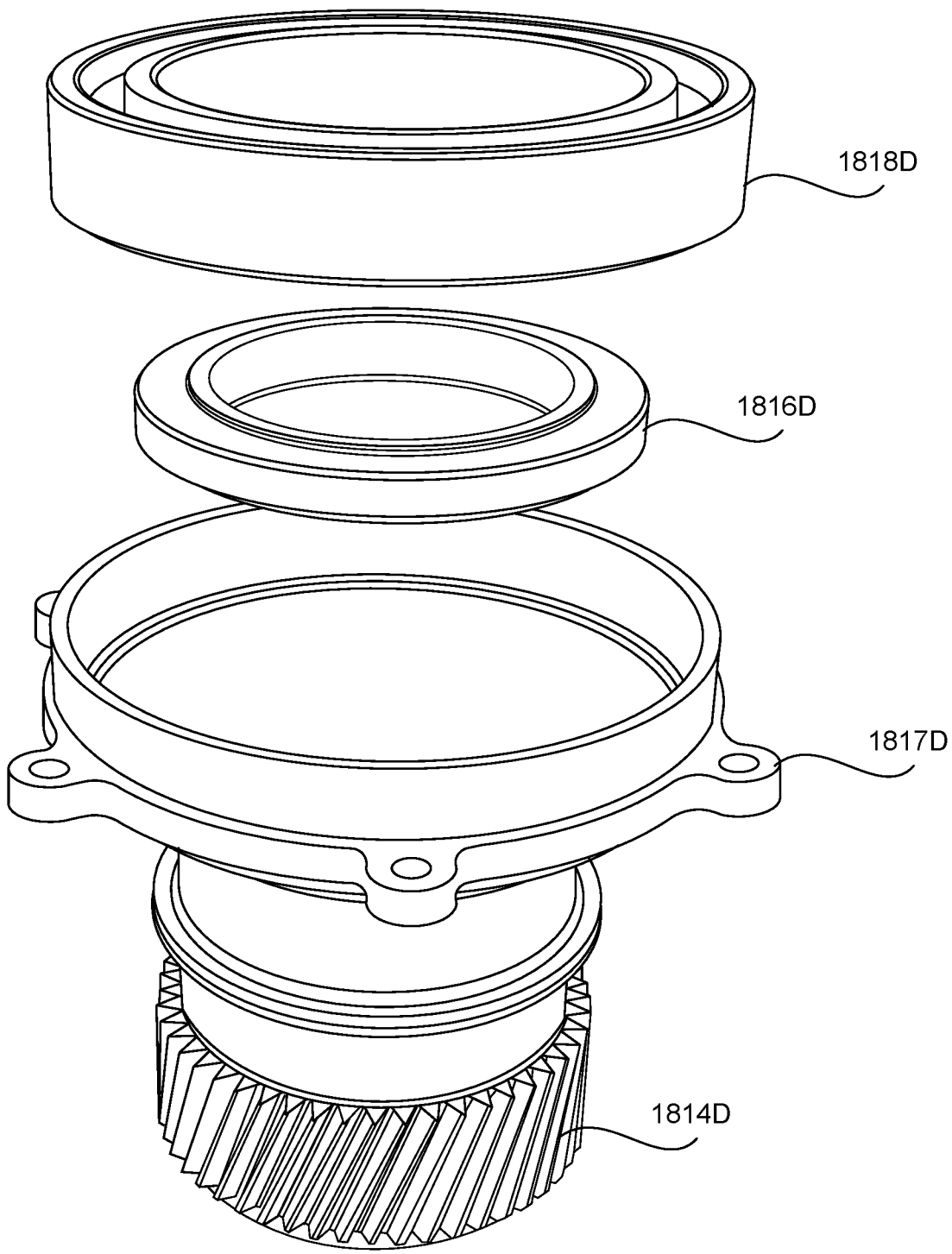
Figure 18E:
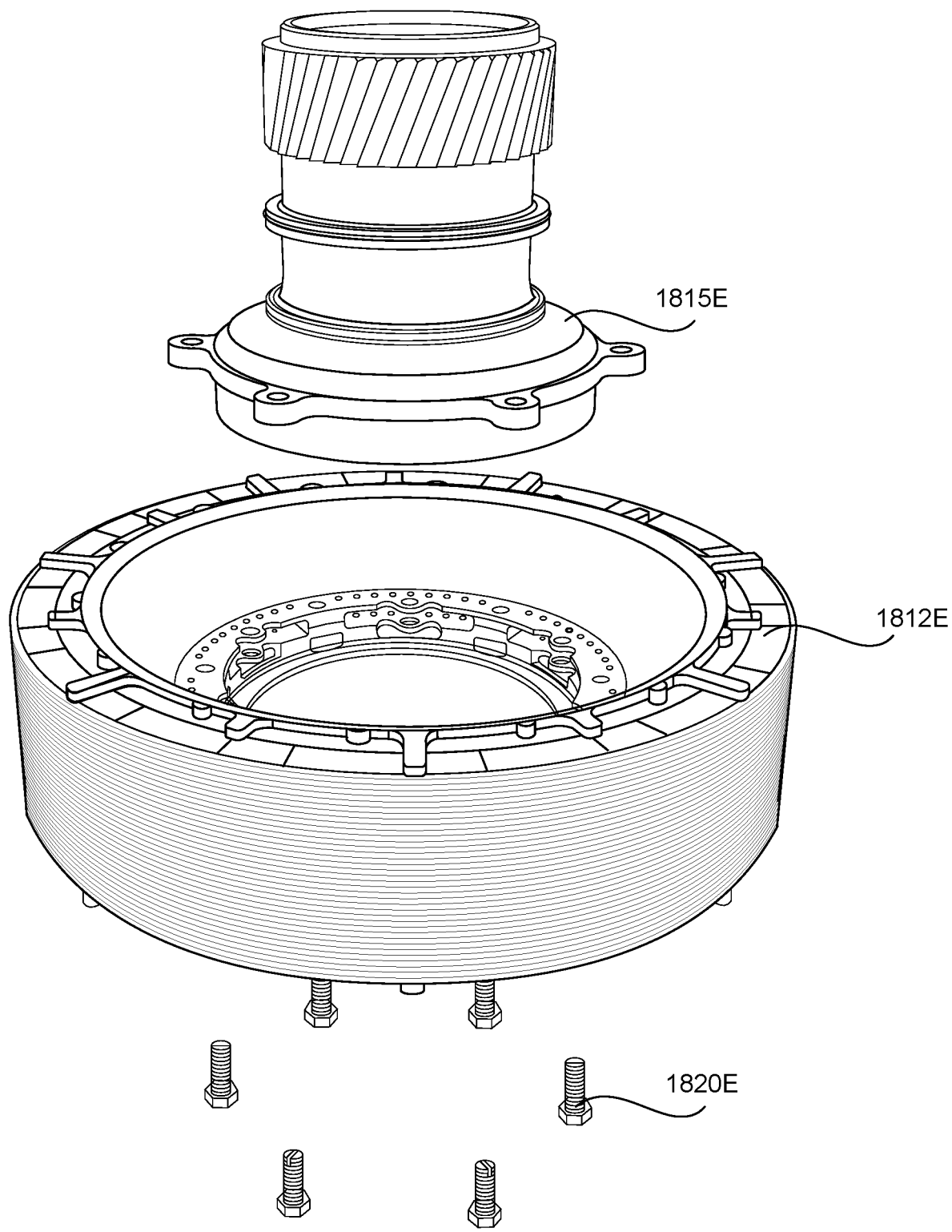
Figure 18F:
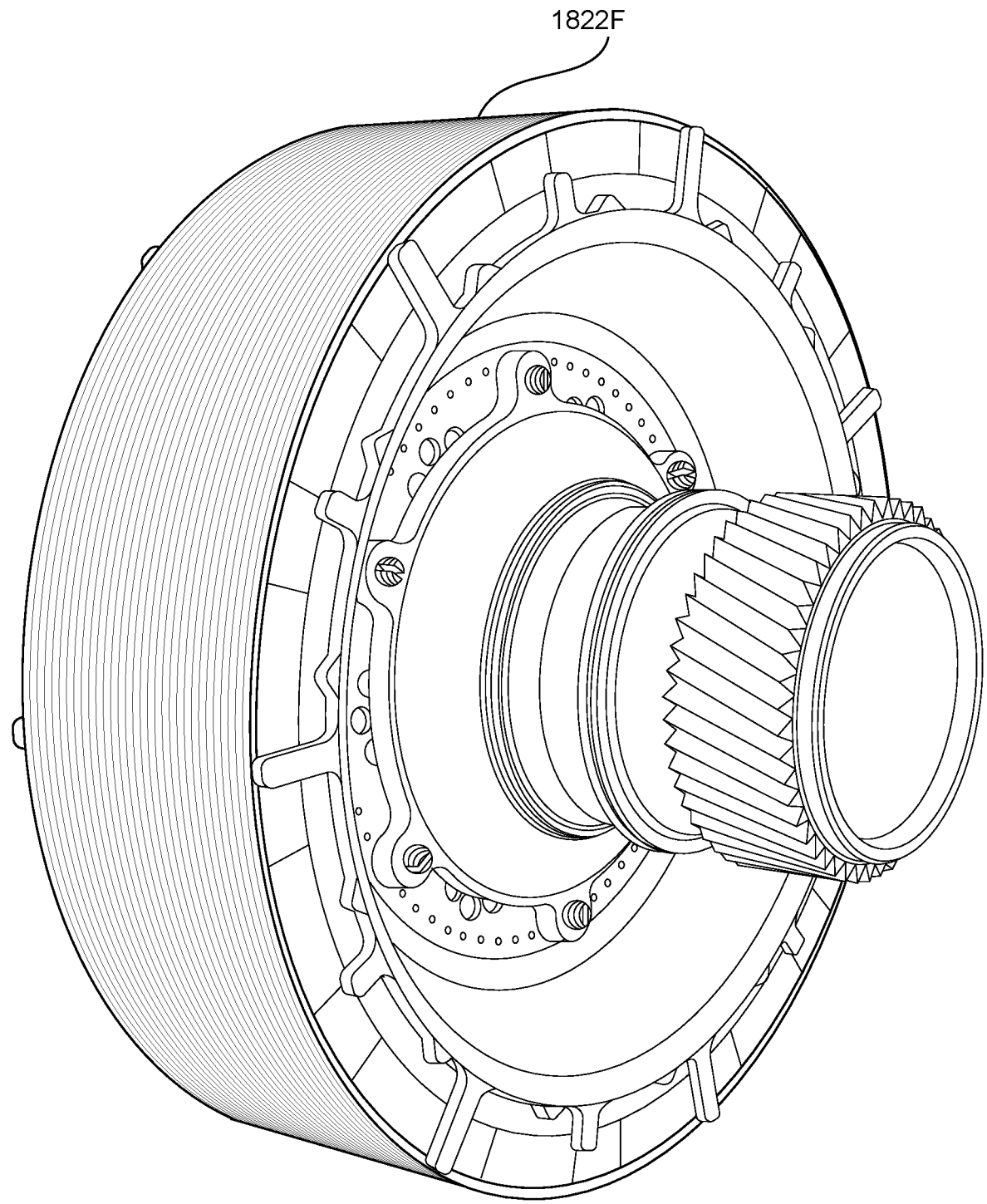

FIGS. 18D-18F illustrates an assembly process for a rotor assembly, consistent with embodiments of the present disclosure. Disclosed embodiments may involve inserting a bearing into a sun gear. For example, referencing FIG. 18D, buttress 1816D and bearing 1818D may be pushed or press fit into sun gear 1814D, thereby forming input gear assembly 1815E as referenced in FIG. 18E. Buttress 1816D may assist in reacting axial loads. Disclosed embodiments may involve attaching the sun gear to the at least one rotor hub. For example, input gear assembly 1815E may be attached to the rotor assembly 1812E to form rotor gear assembly 1822F, as referenced in FIG. 18F. The input gear assembly 1815E may be attached to the rotor assembly 1812C by bolts 1820E. For example, bolts 1820E may extend through holes in the second rotor hub 1810B, the first rotor hub 1808B, and holes 1817D on the input gear assembly 1815E to attach the components together and couple them. In some embodiments, rotor gear assembly 1822F may be balanced, such as by adding rivets and magnetizing. It will be appreciated that disclosed embodiments may involve assembly or manufacturing via any suitable method including, but not limited to, press fits, interference fits, thermal fits, shrink fits, or form fits.

Figure 19:
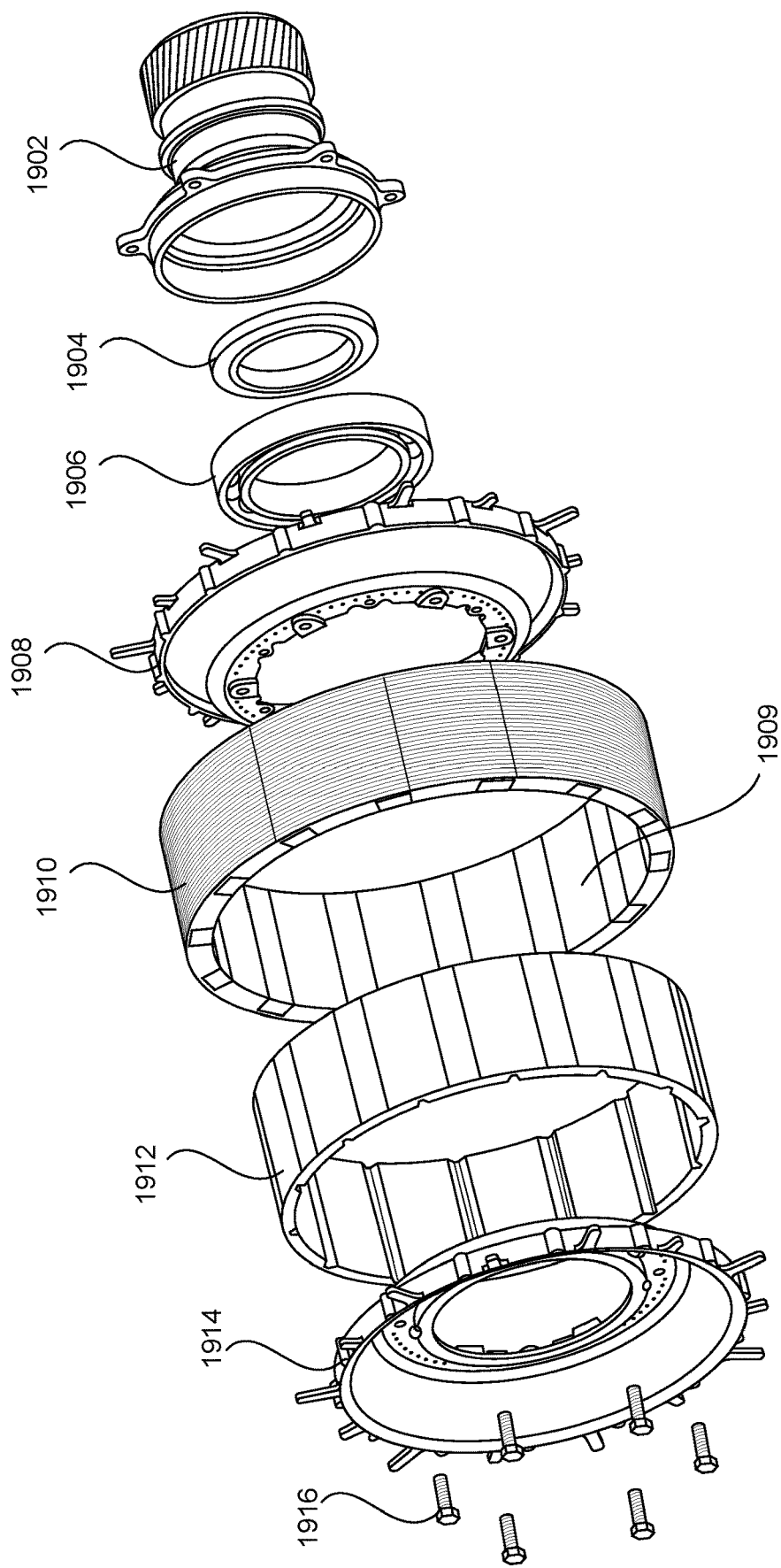
FIG. 19 is an illustration of an exploded view of a rotor assembly, consistent with disclosed embodiments.

FIG. 19 illustrates an exploded view of a rotor assembly, consistent with embodiments of the present disclosure. Rotor assembly 1900 may include bearing 1906 and buttress 1904, both of which may be housed within sun gear 1902. Sleeve 1910 may retain magnet arrangement 1909, and lamination core 1912 may be inserted such that the outer diameter of the lamination core abuts the inner diameter of the magnet arrangement 1909. First rotor hub 1914 and second rotor hub 1908 may be attached to the lamination core, such as by a thermal fit. Bolts 1916 may fasten rotor assembly 1900 by fastening first rotor hub 1914 to second rotor hub 1908 and sun gear 1902, thereby coupling the lamination core 1912 and magnet arrangement 1909 due to the press and shrink fittings as described herein.

Figure 20:
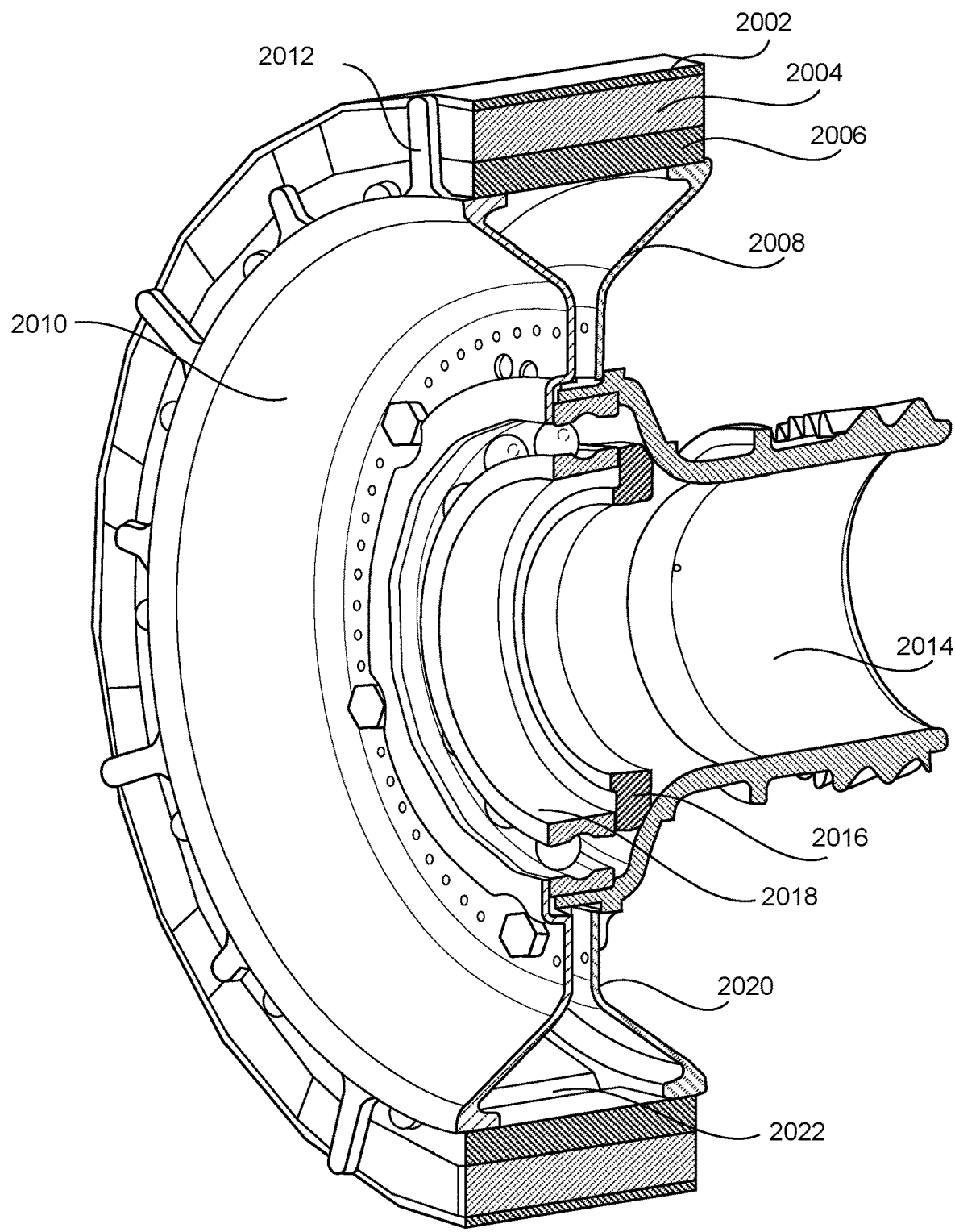
FIG. 20 is an illustration of a cross-sectional view of a rotor assembly, consistent with disclosed embodiments.

FIG. 20 illustrates a cross-sectional view of a rotor assembly, consistent with embodiments of the present disclosure. Magnets 2004 may be disposed around an inner diameter of sleeve 2002. In some embodiments, magnets 2004 may be tapered and circumferentially inserted such that sleeve 2002 stretches and generates pressure on the magnets 2004. Lamination core 2006 may contact magnets 2004, and first rotor hub 2010 and second rotor hub 2008 may be attached to lamination core 2006. Rotor hubs may include protrusions such as protrusions 2012 on first rotor hub 2010, which may assist in retaining the lamination core 2006, magnets 2004, and sleeve 2002. Bolts 2020 may fasten sun gear 2014 to the first rotor hub 2010 and second rotor hub 2008. Buttress 2016 and bearing 2018 may be housed within sun gear 2014 such that loads may be reacted by magnets 2004 rather than bearing 2018. Lamination core 2006 may include triangular notches 2022, as discussed herein.

Figure 21A:
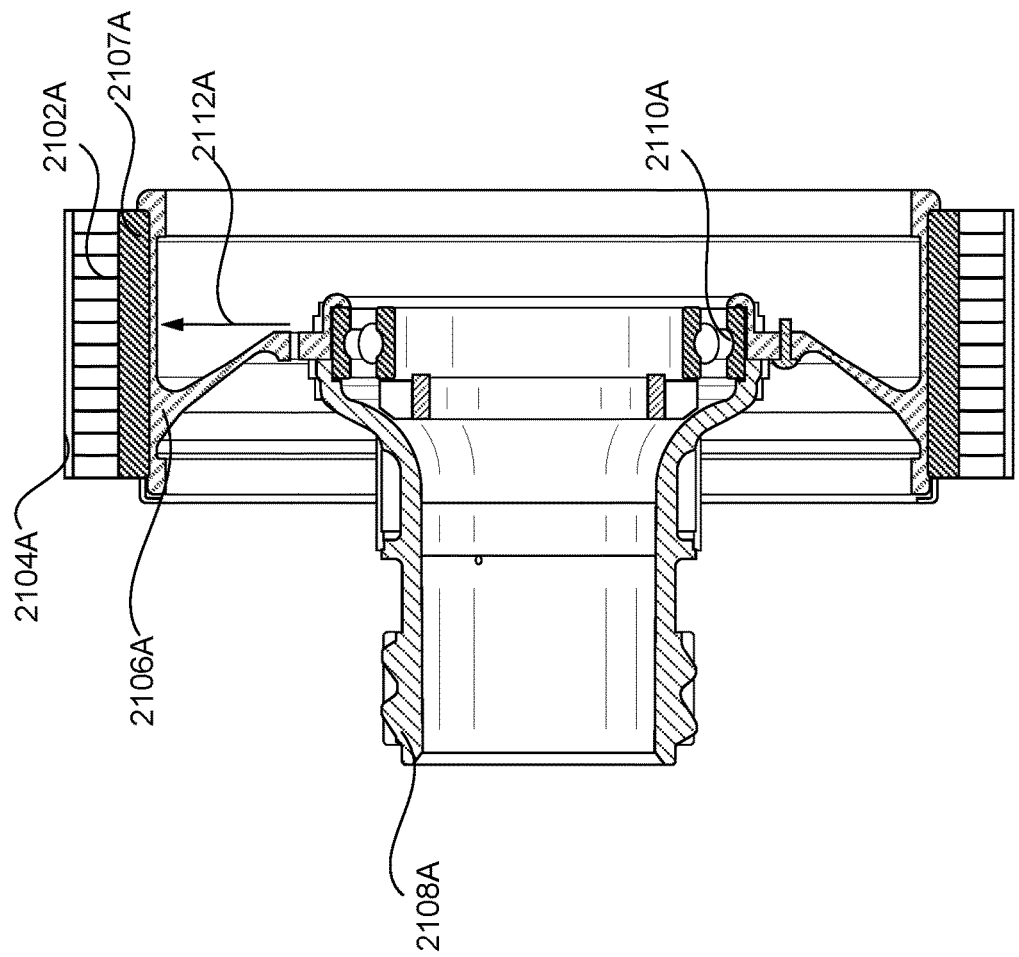
FIGS. 21A-21B are illustrations of cross-sectional views of a rotor assembly, consistent with disclosed embodiments.
Figure 21B:
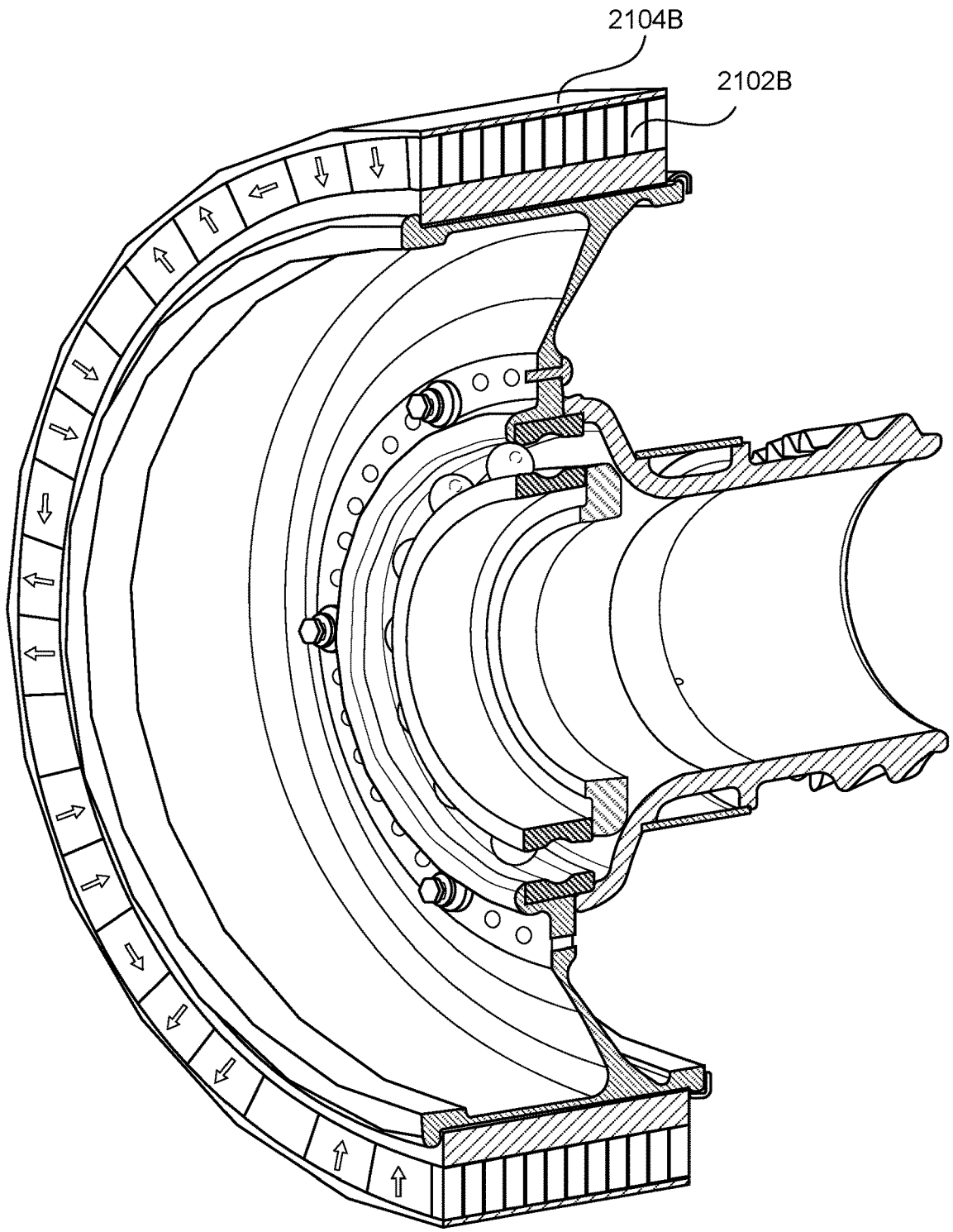

FIG. 21A-21B illustrates cross-sectional views of an alternate rotor assembly, consistent with embodiments of the present disclosure. Rotor assembly 2100A may include magnets 2102A retained by sleeve 2104A. Rotor hub 2106A may contact sun gear 2108A and bearing 2110A. In some embodiments, magnets 2102B may be placed radially and enclosed by sleeve 2014B.

It will be recognized that during operation of the rotor assembly, magnets may experience high heat or increases in temperature which may be detrimental to performance or efficiency. For example, high temperatures may result in demagnetization. Disclosed embodiments may involve cooling of magnets in the rotor. Magnets may be cooled through heat exchange or heat transfer, such as convection. In some embodiments, fluids, such as coolants may exchange heat with the tapered magnets to provide cooling. As a non-limiting example, fluids and coolants may include air, glycerol, and oil. In some embodiments, fluids used to cool the magnets may also be used as lubricants in the electrical propulsion system. In some embodiments, magnets may be cooled indirectly. Indirect cooling may involve cooling in which the coolant does not contact the magnets. For example, fluids 2112A may be directed towards rotor hub 2106A, as referenced in FIG. 21A. The fluids 2112A may contact the rotor hub 2106A, and indirectly cool the magnets 2102A by providing heat exchange through the rotor hub 2106A. For example, the fluids 2112A may contact rotor hub 2106A, and rotor hub 2106A may have a press fit with lamination core 2107A, thus heat exchange may be transferred to the rotor hub 2106A, to the lamination core 2107A, and to the magnets 2102A.

Disclosed embodiments may involve at least one cavity disposed between the plurality of tapered magnets and the lamination core. A cavity may include a space such as a gap, hole, passage, outlet, or chamber. For example, the space between a magnet in the plurality of tapered magnets and the lamination core may form the cavity. In some embodiments, the cavity may be the gap between the lamination core and magnets with curved faces, as described herein. In some embodiments, the cavity may be configured to guide a fluid for cooling. Configured to guide a fluid may involve directing the movement of a fluid, such as oil. For example, the cavity may guide the fluid by directing the fluid towards the magnets. As an example, the cavity may be small, such as a two hundred microns in diameter or height.

Figure 22:
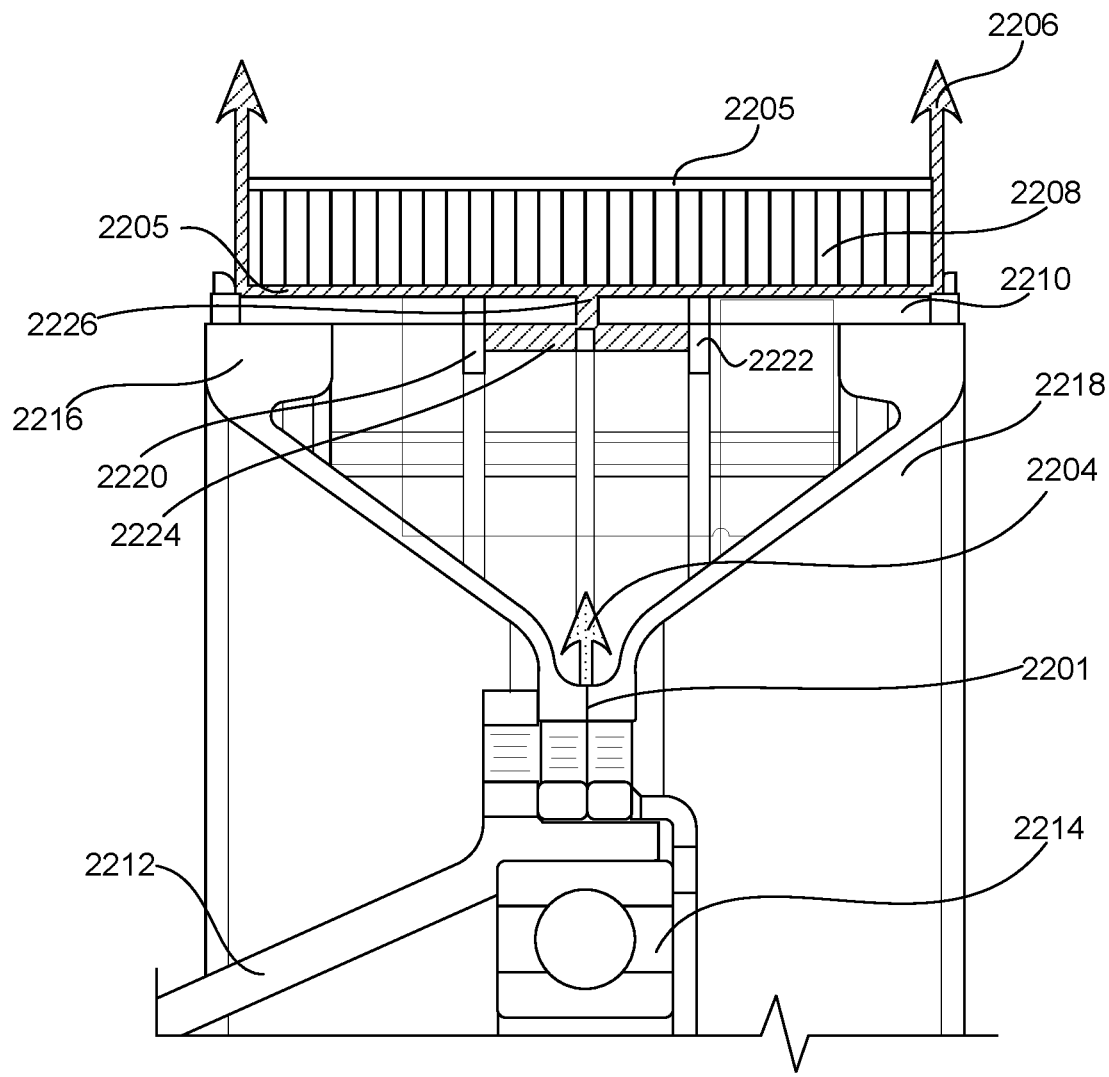
FIG. 22 is an illustration of a cross-sectional view of a rotor assembly, consistent with disclosed embodiments.

FIG. 22 illustrates a cross-sectional view of a rotor assembly, consistent with embodiments of the present disclosure. Rotor assembly 2200 may include lamination core 2210 contacting tapered magnets 2208, which may be retained by sleeve 2205. In some embodiments, fluids such as oil may be distributed throughout the electric propulsion system. For example, oil may be distributed to and provide lubrication for sun gear 2212 or bearing 2214. It will be recognized that the rotor and the sun gear 2212 may rotate, thereby causing the oil to experience centrifugal force. For example, oil flowing adjacent to sun gear 2212 or bearing 2214 may experience centrifugal force, and may be directed towards the rotor hubs. The centrifugal force may drive or splash the oil such that the oil enters gap 2201 between first rotor hub 2216 and second rotor hub 2218, and the centrifugal force may drive the oil to travel in a direction 2204 towards the lamination core 2210. For example, oil may travel in the gap provided by separation distance 1708B between first rotor hub 1702B and second rotor hub 1704B, as referenced in FIG. 17B. In some embodiments, the lamination core or the at least one cavity may allow direct cooling of the plurality of tapered magnets. Direct cooling may involve heat transfer where a fluid such as a coolant contacts the magnets. For example, direct cooling may involve the magnets exchanging heat with oil that contacts the magnets. In some embodiments, lamination core 2210 may include wall 2220 and wall 2222, such that when oil moves in direction 2204 toward lamination core 2210, the oil forms a collection of oil, such as pool 2224. Centrifugal force or pressure may drive oil from the pool, through opening 2226 to cavity 2202. In some embodiments, opening 2226 may be provided to allow for the flow of fluids such as coolants. For example, opening 2226 may be a leak path or hole such that pressure drives the movement of oil through the opening 2226 and into the cavity 2202. Cavity 2202 may be disposed between magnets 2208 and lamination core 2202. The oil may reside in cavity 2202 such that the oil may contact the magnets 2208 and provide cooling. For example, the oil may directly contact magnets 2208 to provide heat exchange. In some embodiments, centrifugal force may drive the oil in a direction 2206, such that the oil contacts different portions of the magnets 2208, such as side or axial faces and end or inner diameter faces of the tapered magnets 2208, thereby increasing the surface area of the magnets that experience heat transfer. It will be appreciated that the lamination core and the cavity allowing direct cooling of the magnets improves cooling and heat transfer. For example, as oil travels through the opening, the oil may be a fluid flowing in a small area and thereby have a high velocity, resulting in an be moving increased heat transfer coefficient. Additionally, in comparison to indirect cooling, directly applying oil to portions of magnets 2208 may result in an increase in the amount of surface area of magnets experiencing heat transfer,=thus increasing the rate of heat transfer. Further, direct cooling may reduce thermal impedance as the oil exchanges heat with the magnets rather than conducting heat through other components. In some embodiments, fluids such as oil may return to distribution channels or reservoirs from cooling magnets 2208 through leak paths, cavities, or holes in lamination core 2202.

Figure 23A:
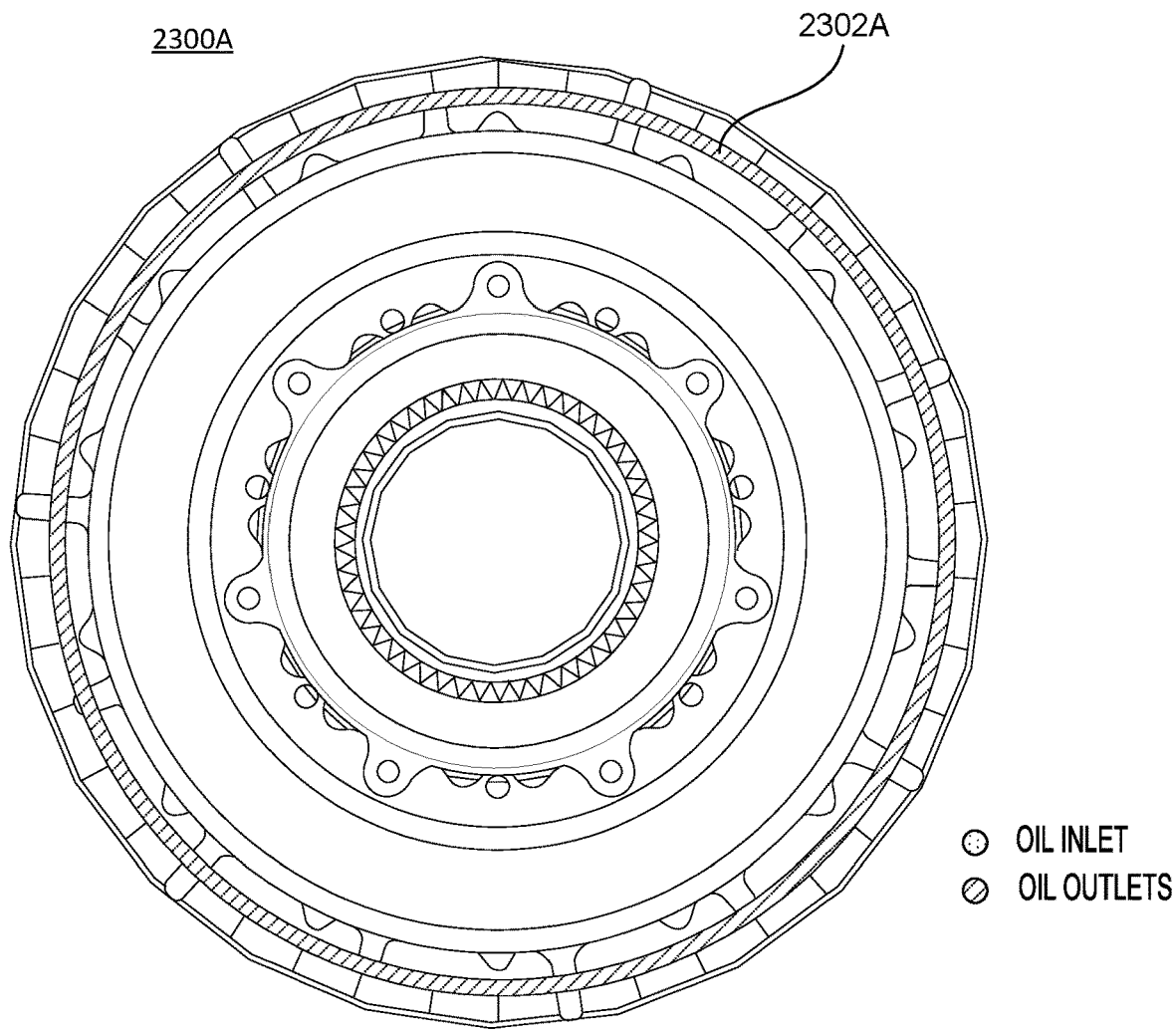
FIGS. 23A-23B are illustrations of front views of a rotor assembly, consistent with disclosed embodiments.
Figure 23B:
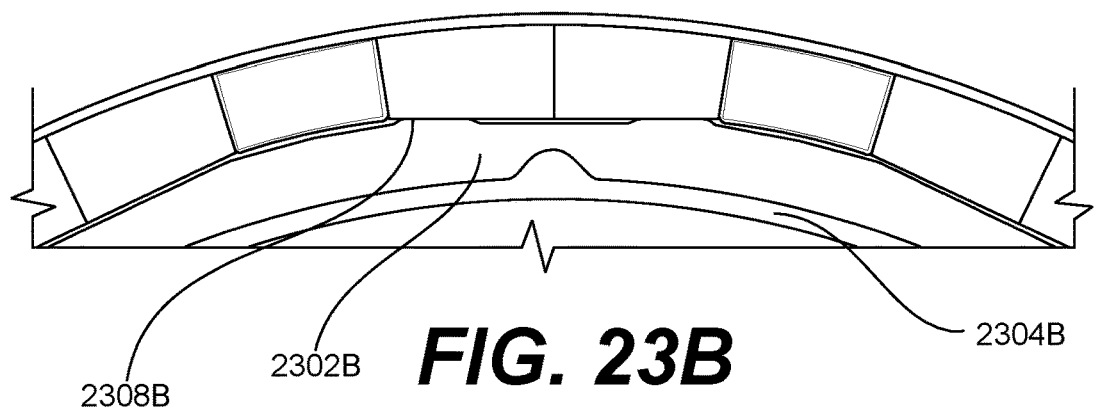

FIGS. 23A-23B illustrate front views of a rotor assembly, consistent with embodiments of the present disclosure. In some embodiments, rotor assembly 2300A may include one or more cavities 2302A distributed along the circumference. For example, cavities may be oil outlets, such as cavity 2302B positioned between some portions of the lamination core 2304B and tapered magnets 2306B. Tapered magnets 2306B may include an inner diameter face 2308B which directly contacts oil in cavities 2302B. For example, inner diameter face 2308B may comprise the curved side or curved face 1408B as referenced in FIG. 14B. In some embodiments, cavities 2302B may comprise the space between the lamination core 2304B and magnets with a curved face 1408B, as referenced in FIG. 14B. It will be appreciated that as the cavities may be between the lamination core and magnets with curved faces, torque transmission may still be provided through magnets flat sides, such as magnets 1406B which may abut on the lamination core 2304B.

The embodiments disclosed herein are intended to be non-limiting. Those of ordinary skill in the art will appreciate that certain components and configurations of components may be modified without departing from the scope of the disclosed embodiments. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. A rotor assembly comprising:
   a sleeve;
   a rotor hub;
   a lamination core; and
   a plurality of tapered magnets disposed circumferentially around an inner diameter of the sleeve, each tapered magnet of the plurality of tapered magnets being configured to abut another tapered magnet of the plurality of tapered magnets,
   wherein the plurality of tapered magnets includes a first set of tapered magnets inserted axially into the sleeve and a second set of tapered magnets inserted axially into the sleeve,
   wherein insertion of the first set of tapered magnets axially relative to the second set of tapered magnets is configured to increase a diameter of the sleeve, and
   wherein the rotor hub is configured to retain the lamination core, the plurality of tapered magnets, and the sleeve.

2. The rotor assembly of claim 1, wherein the sleeve is comprised of carbon fiber.

3. The rotor assembly of claim 1, wherein the lamination core includes at least one notch.

4. The rotor assembly of claim 1, further comprising:
   a second rotor hub;
   wherein the rotor hub is abutting a first side of the lamination core in an axial direction, and the second rotor hub is abutting a second side of the lamination core in the axial direction opposite the first side.

5. The rotor assembly of claim 1, further comprising at least one cavity disposed between the plurality of tapered magnets and the lamination core, wherein the at least one cavity is configured to guide a fluid for cooling.

6. The rotor assembly of claim 5, wherein the lamination core or the at least one cavity are configured to allow direct cooling of the plurality of tapered magnets.

7. An electric propulsion system for a vertical take-off and landing (VTOL) aircraft the electric propulsion system comprising:
at least one electrical engine mechanically connected directly or indirectly to a fuselage of the VTOL aircraft, the electrical engine comprising:
a gearbox assembly comprising:
a sun gear; and
an electrical motor having a stator and a rotor assembly;
the rotor assembly comprising:
a sleeve;
a rotor hub;
a lamination core; and
a plurality of tapered magnets disposed circumferentially around an inner diameter of the sleeve, each tapered magnet of the plurality of tapered magnets being configured to abut another tapered magnet of the plurality of tapered magnets,
wherein the plurality of tapered magnets includes a first set of tapered magnets inserted axially into the sleeve and a second set of tapered magnets inserted axially into the sleeve,
wherein insertion of the first set of tapered magnets axially relative to the second set of tapered magnets is configured to increase a diameter of the sleeve,
wherein the rotor hub is configured to retain the lamination core, the plurality of tapered magnets, and the sleeve, and
wherein the sun gear is attached to the rotor hub.

8. The system of claim 7, wherein the sleeve is comprised of carbon fiber.

9. The system of claim 7, wherein the lamination core includes at least one notch.

10. The system of claim 7, further comprising:
a second rotor hub;
wherein the rotor hub is abutting a first side of the lamination core in an axial direction, and the second rotor hub abutting a second side of the lamination core in the axial direction.

11. The rotor assembly of claim 7, further comprising at least one cavity disposed between the plurality of tapered magnets and the lamination core, wherein the at least one cavity is configured to guide a fluid for cooling.

12. The rotor assembly of claim 11, wherein the lamination core or the at least one cavity allow direct cooling of the plurality of tapered magnets.

13. The system of claim 7, wherein the gearbox includes a bearing, wherein an outer diameter of the bearing contacts an inner diameter of the sun gear.

14. A method of assembling a rotor assembly, comprising:
inserting a first plurality of tapered magnets and a second plurality of tapered magnets into a stretchable sleeve from opposing axial directions such the each of the second plurality of tapered magnets is positioned between adjacent pairs of the first plurality of magnets, the first and second plurality of magnets being arranged to abut an inner surface of the stretchable sleeve;
inserting a lamination core, wherein an outer diameter of the lamination core abuts at least some of the first and second plurality of tapered magnets; and
attaching at least one rotor hub to the lamination core.

15. The method of claim 14, wherein inserting a first plurality of tapered magnets and a second plurality of tapered magnets includes causing a diameter of the stretchable sleeve to increase.

16. The method of claim 14, further comprising inserting a bearing into a sun gear, and attaching the sun gear to the at least one rotor hub.

17. The method of claim 14, further comprising balancing the rotor assembly.

18. The method of claim 14, wherein the at least one rotor hub retains the lamination core, the magnet arrangement, and the stretchable sleeve.

* * * * *